Feb. 12, 1952 J. E. PRESTON 2,585,677
ROLL FORGING MACHINE
Filed Jan. 15, 1945 21 Sheets-Sheet 1

INVENTOR.
John E. Preston.
BY
Harness, Dickey & Pierce.
ATTORNEYS.

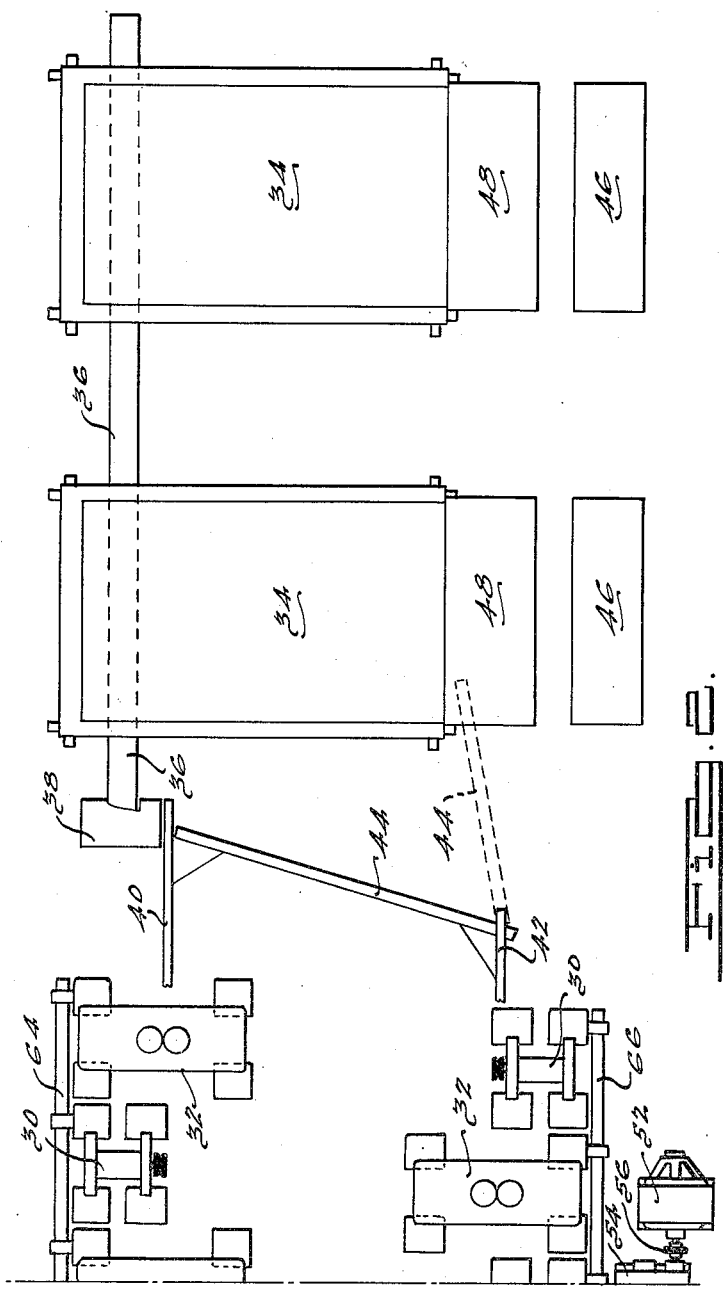

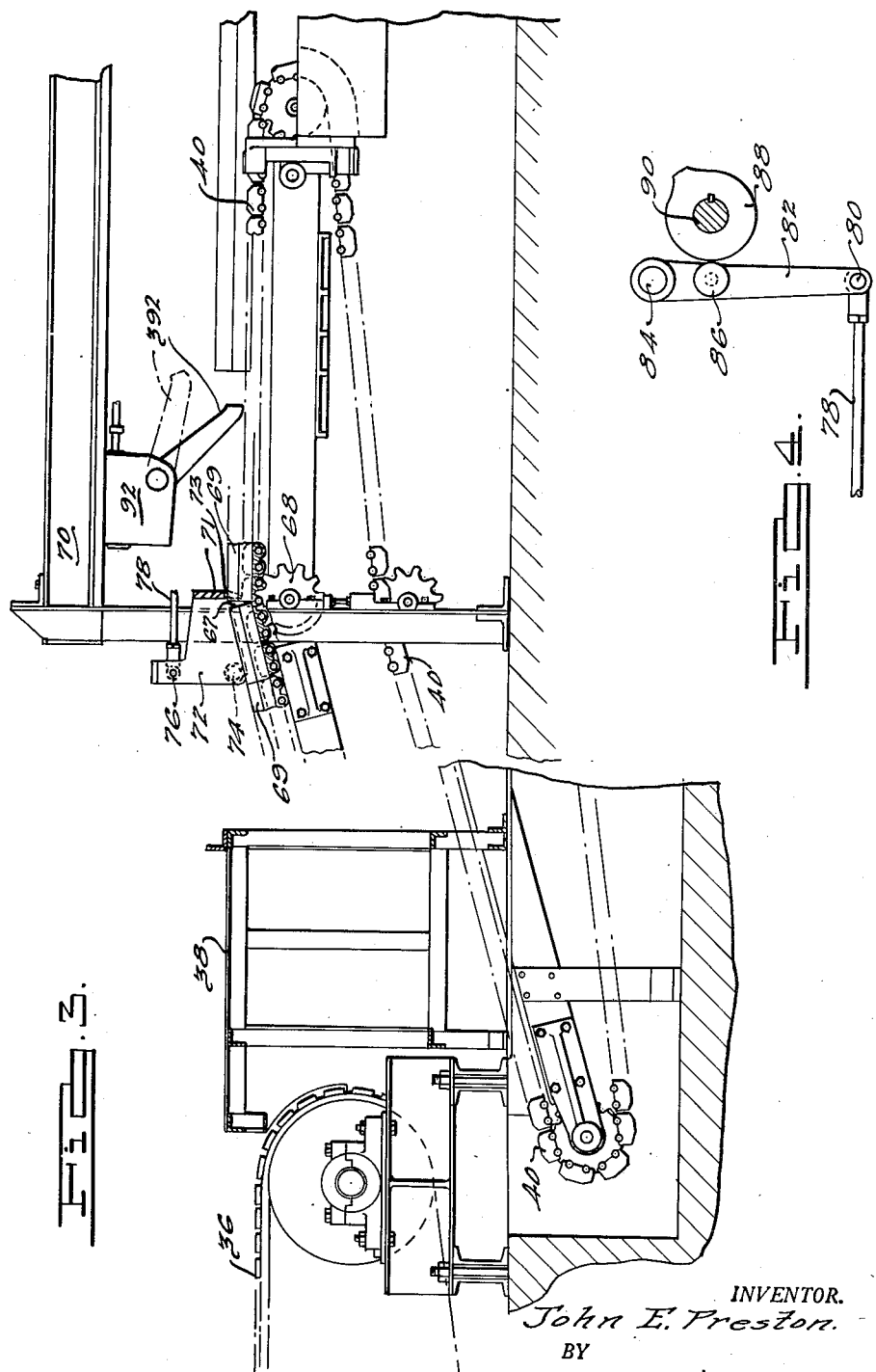

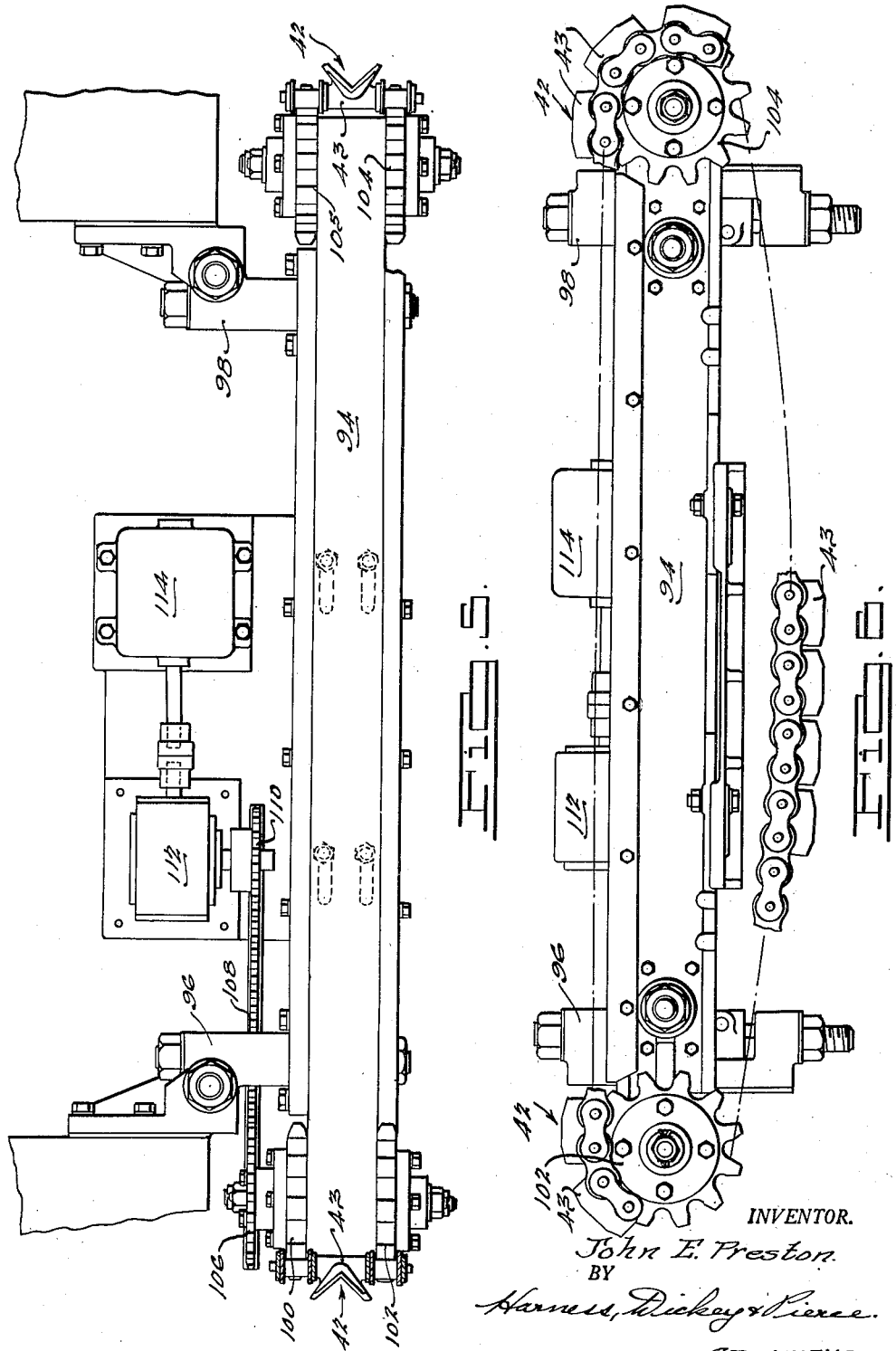

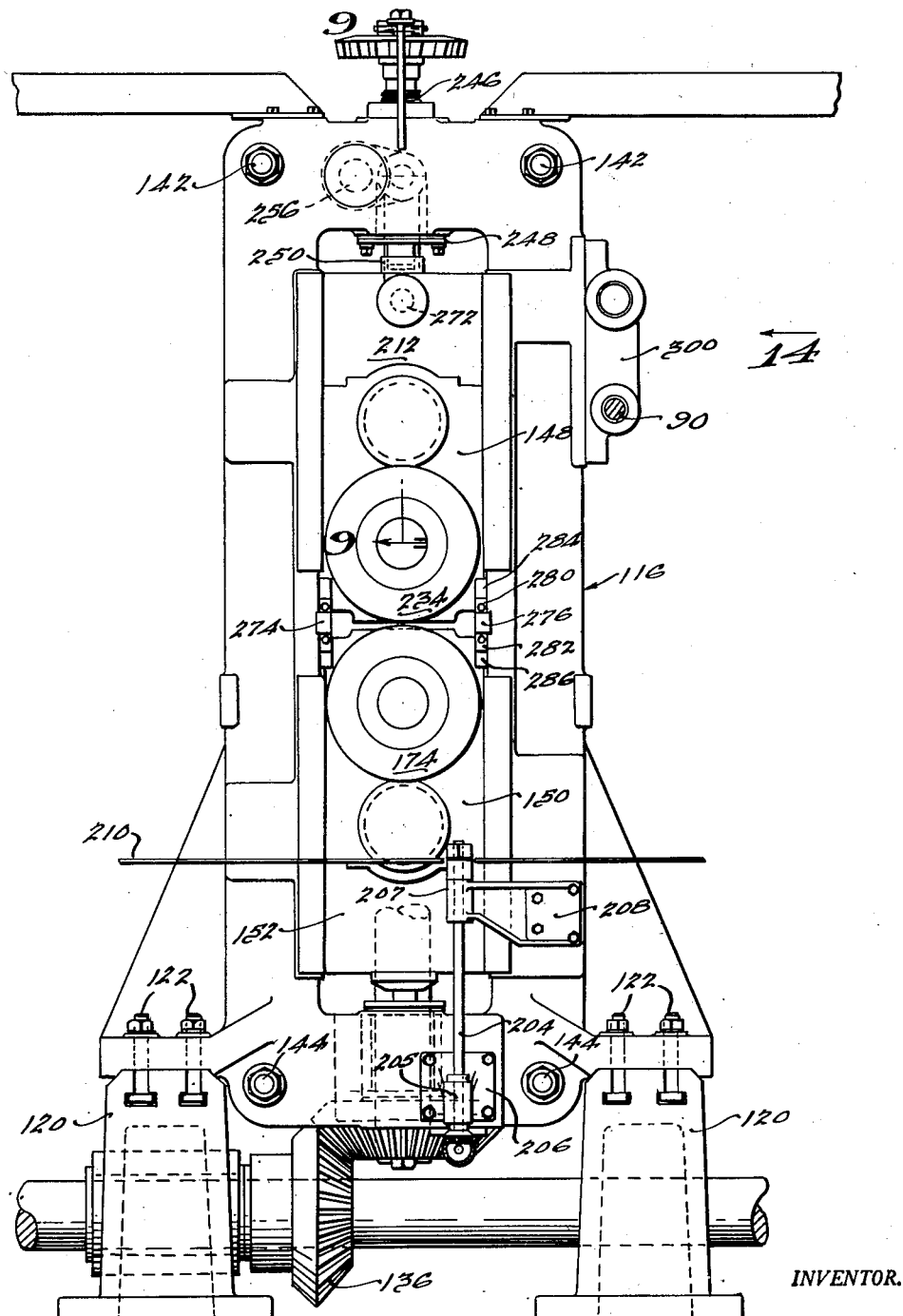

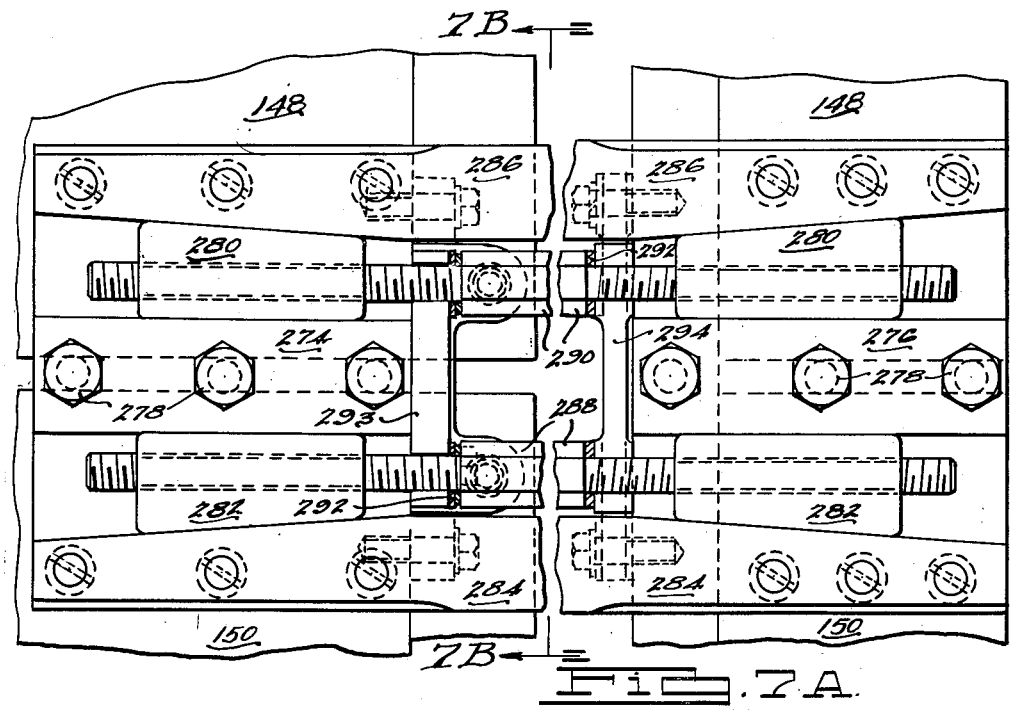
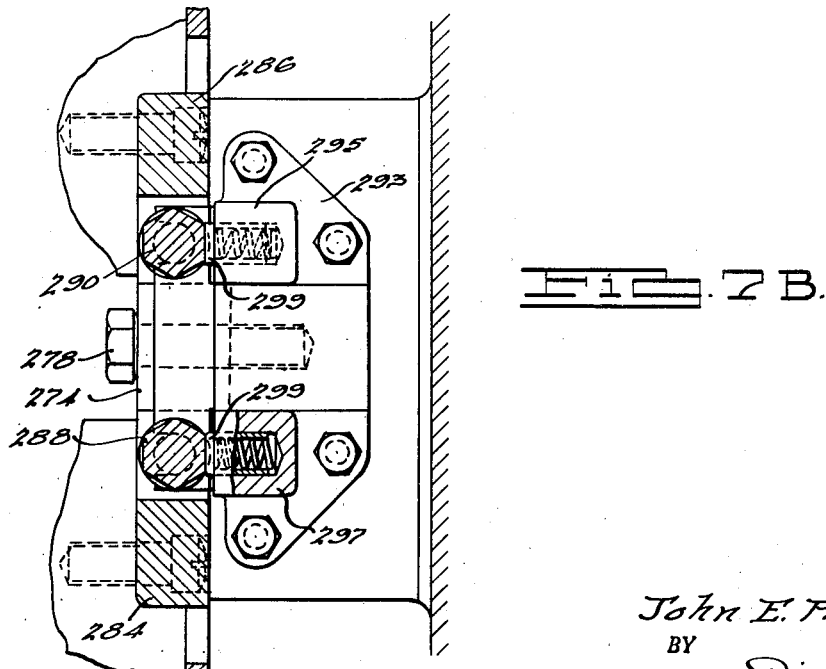

Feb. 12, 1952 J. E. PRESTON 2,585,677
ROLL FORGING MACHINE
Filed Jan. 15, 1945 21 Sheets-Sheet 7

INVENTOR.
John E. Preston.
BY
Harness, Dickey & Pierce.
ATTORNEYS.

Feb. 12, 1952  J. E. PRESTON  2,585,677
ROLL FORGING MACHINE
Filed Jan. 15, 1945  21 Sheets-Sheet 8

INVENTOR.
John E. Preston.
BY
Harness, Dickey & Pierce
ATTORNEYS.

Feb. 12, 1952     J. E. PRESTON     2,585,677
ROLL FORGING MACHINE
Filed Jan. 15, 1945     21 Sheets-Sheet 9

INVENTOR.
John E. Preston.
BY
Harness, Dickey & Pierce.
ATTORNEYS.

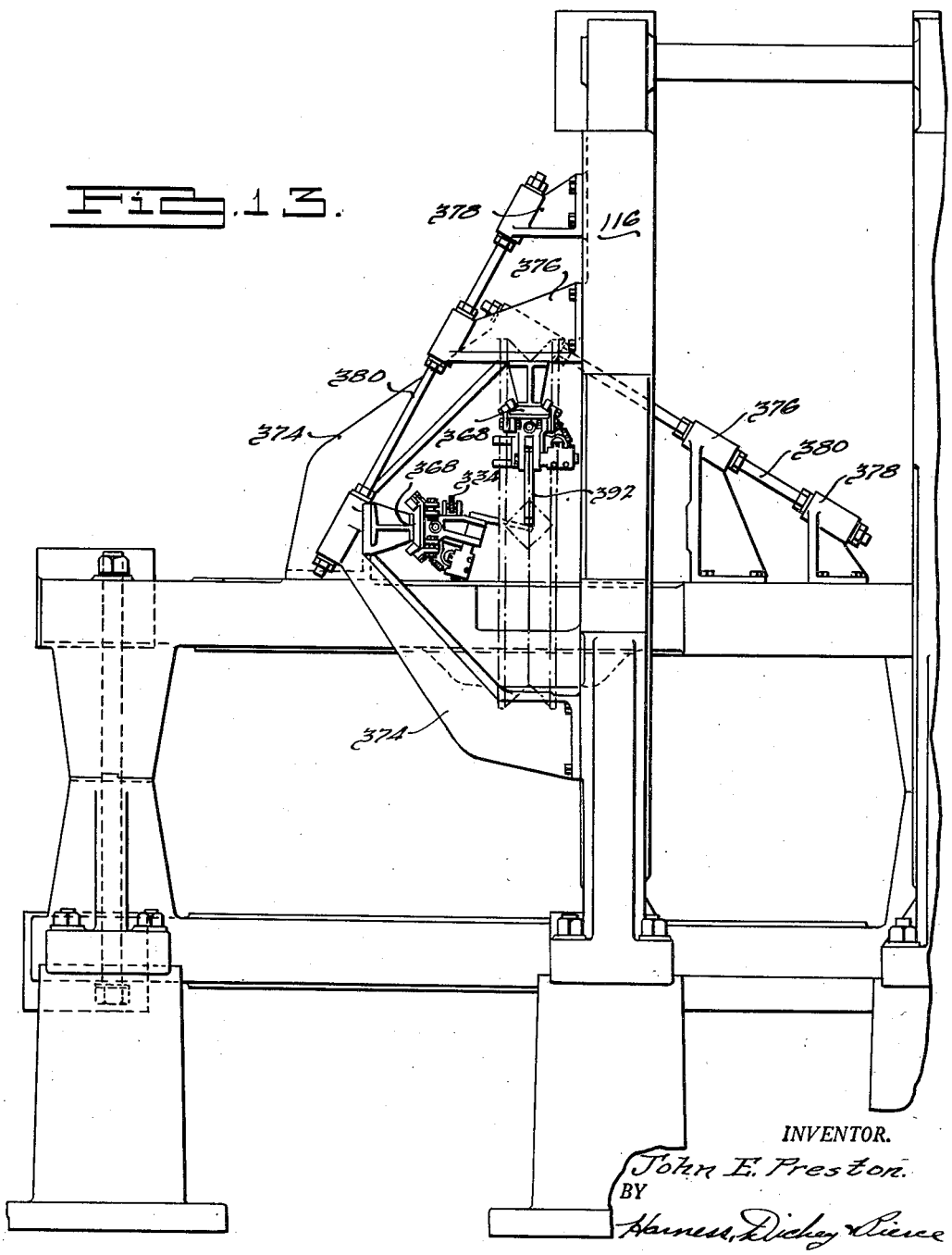

Feb. 12, 1952          J. E. PRESTON          2,585,677
ROLL FORGING MACHINE
Filed Jan. 15, 1945          21 Sheets-Sheet 12
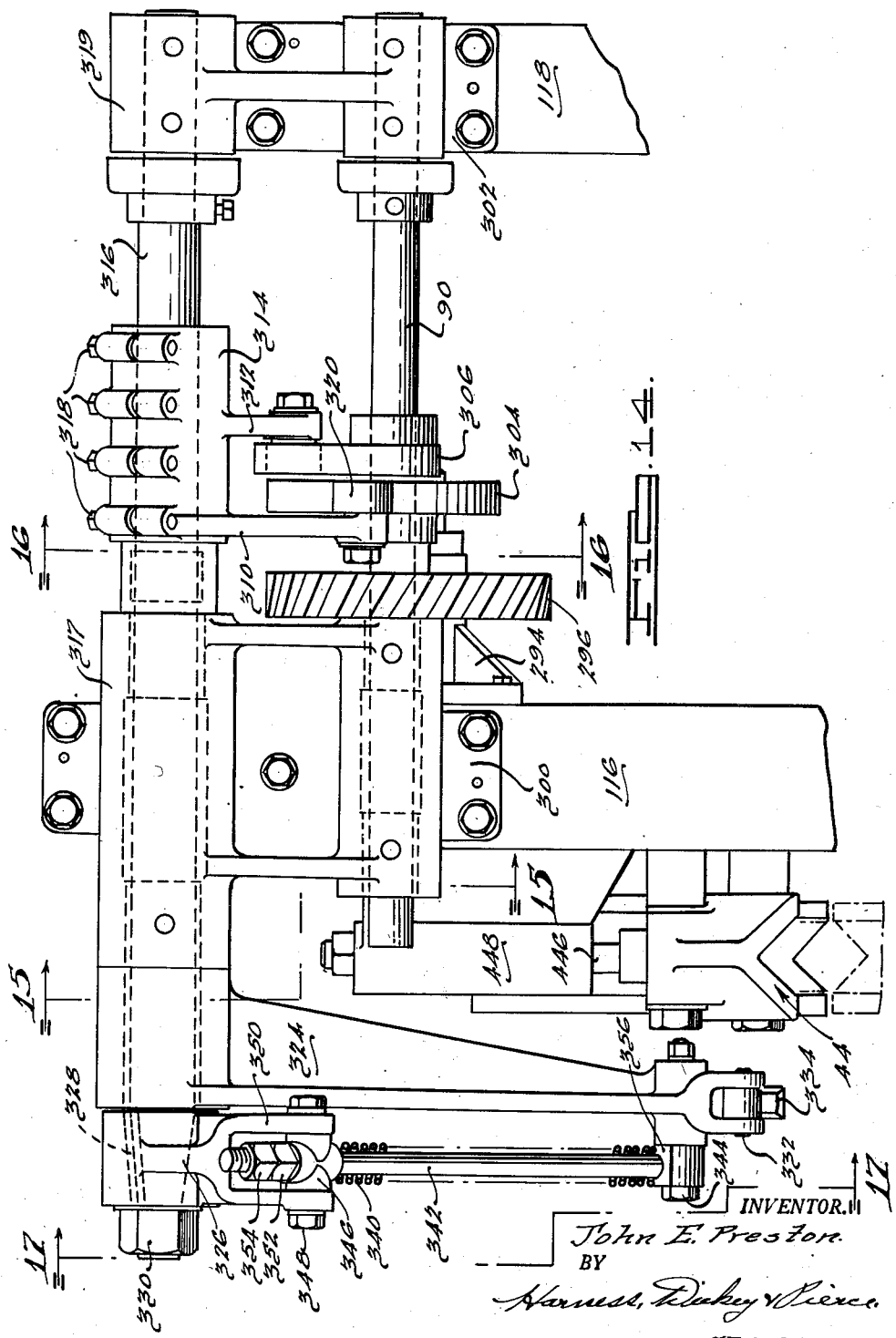
INVENTOR.
John E. Preston.
BY
Harness, Dickey & Pierce.
ATTORNEYS.

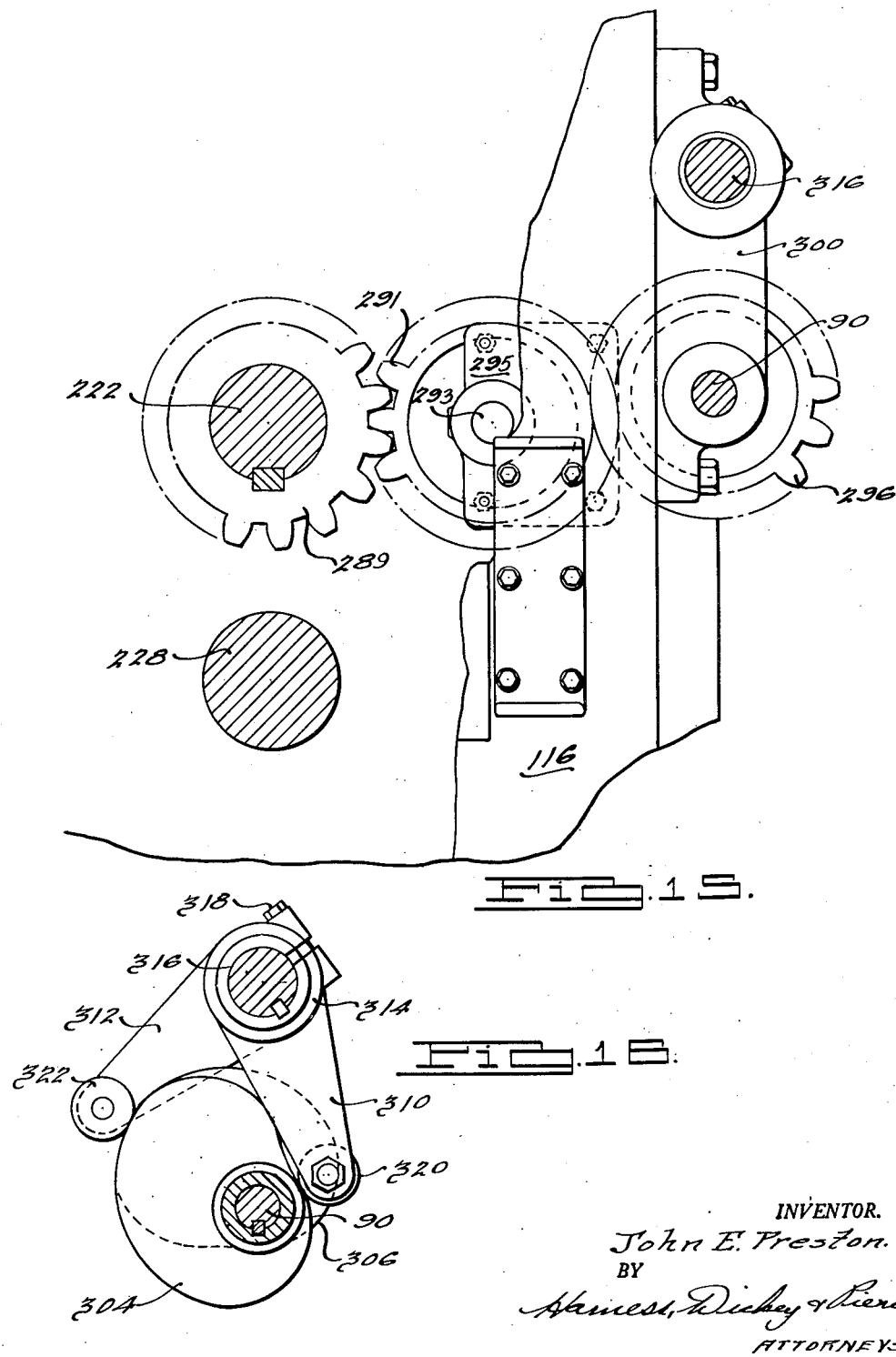

Feb. 12, 1952     J. E. PRESTON     2,585,677
ROLL FORGING MACHINE
Filed Jan. 15, 1945     21 Sheets-Sheet 14

INVENTOR.
John E. Preston.
BY
Harness, Dickey & Pierce.
ATTORNEYS.

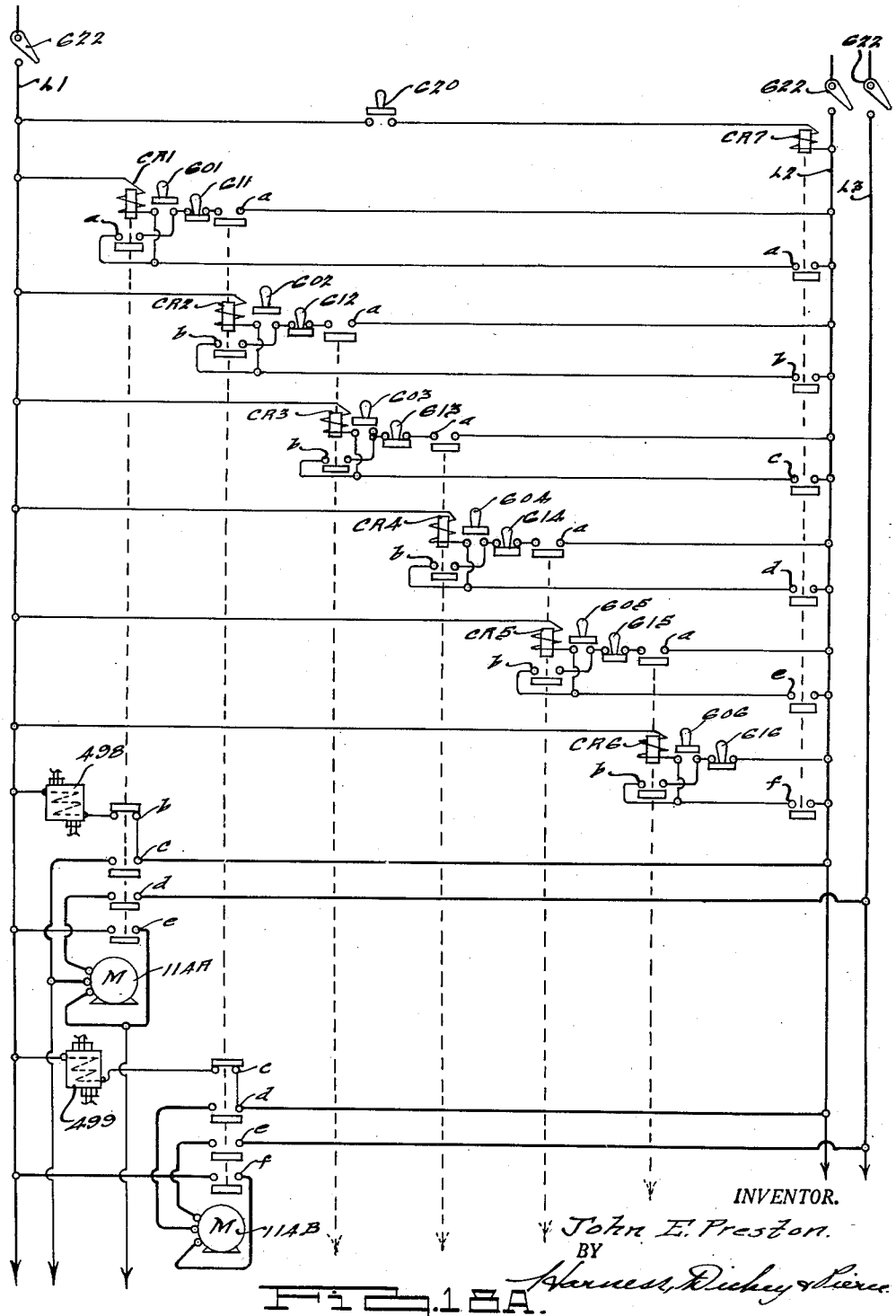

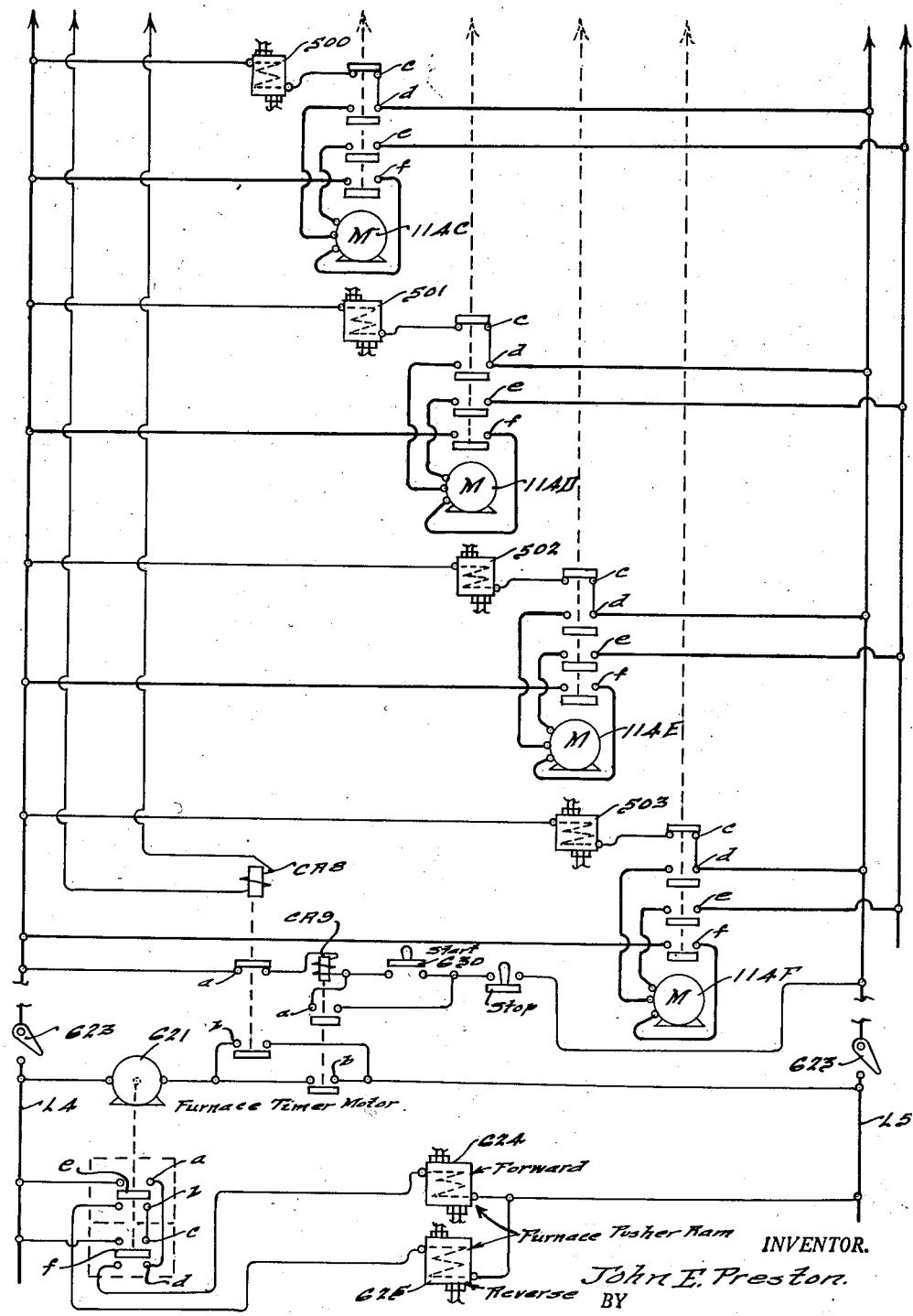

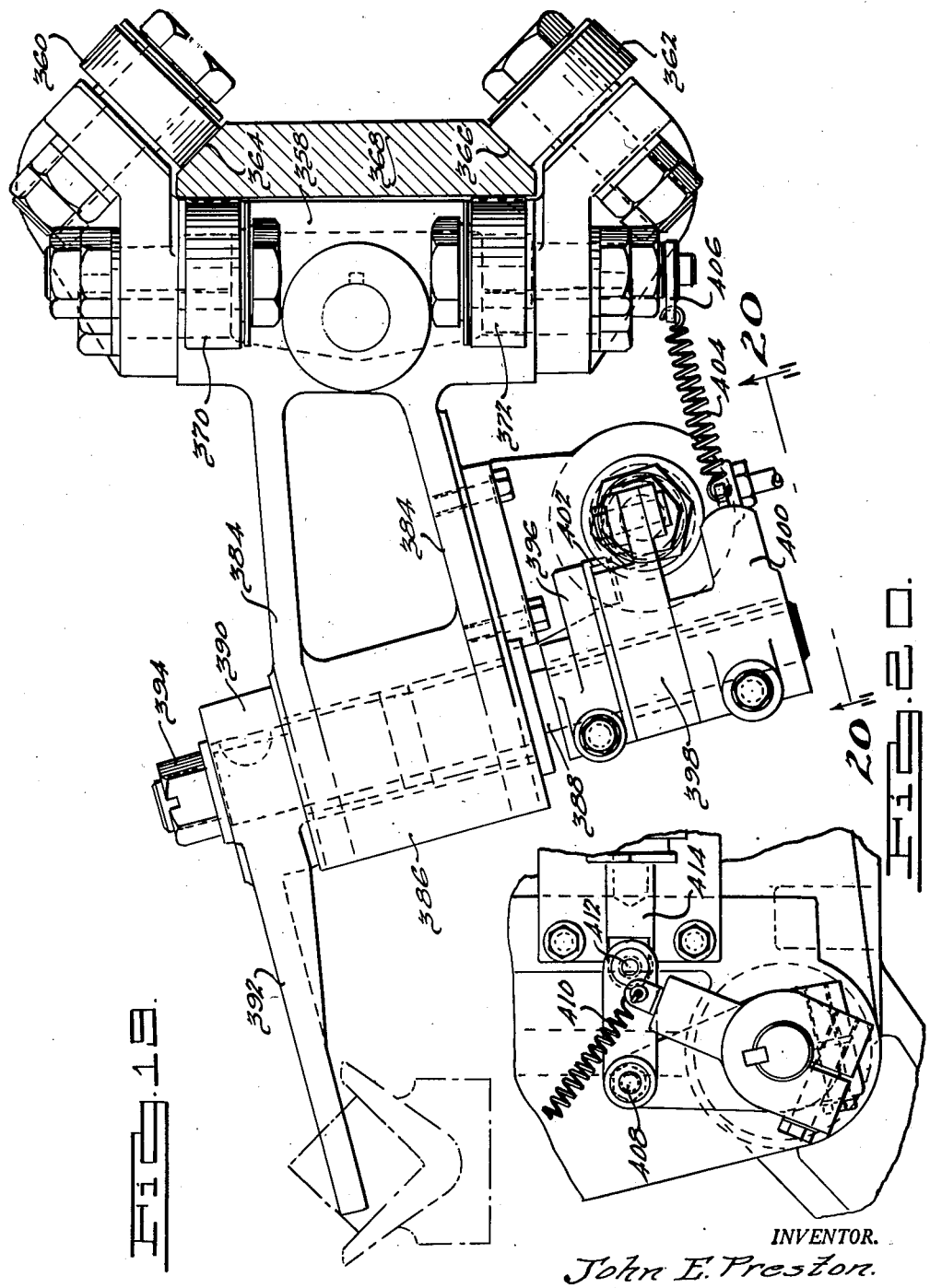

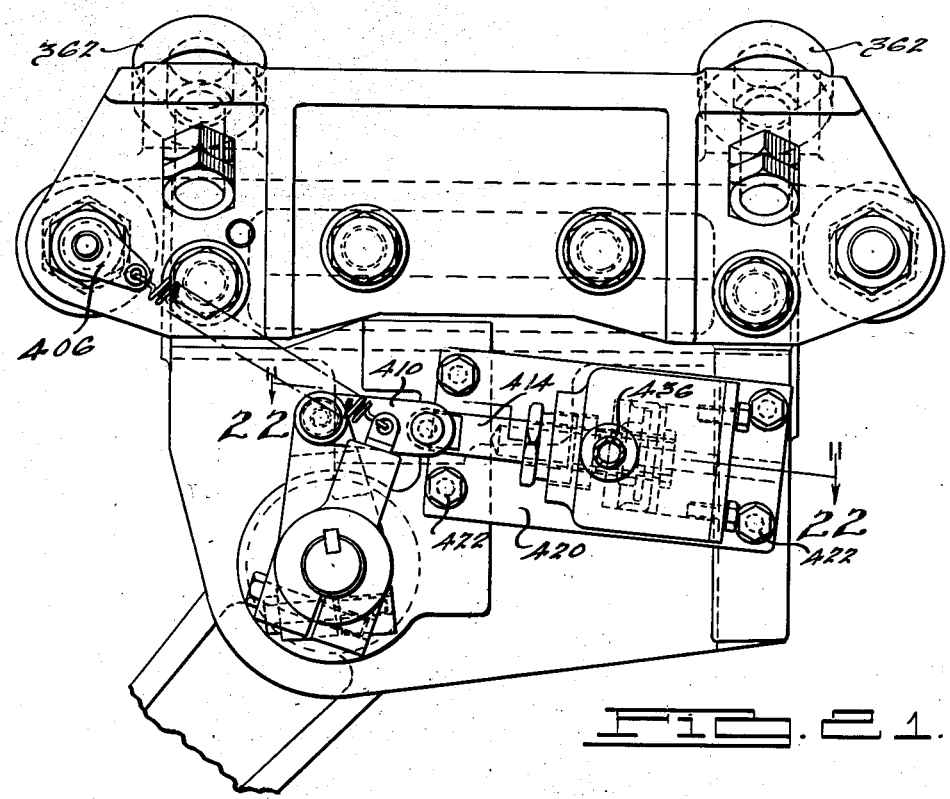
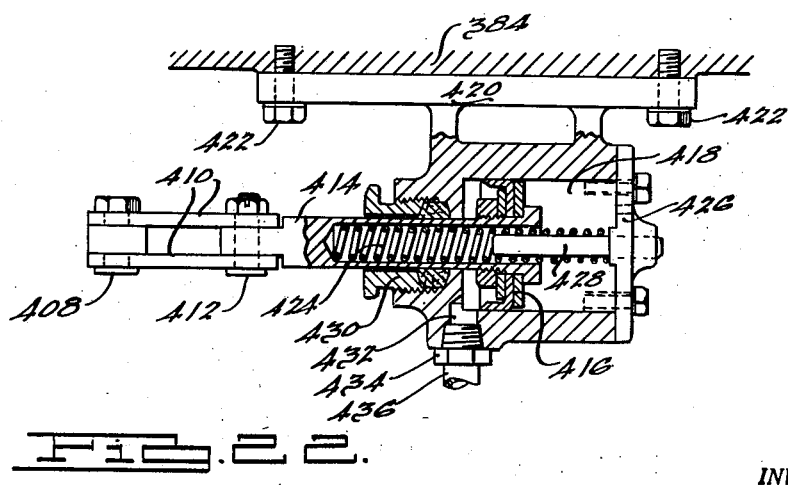

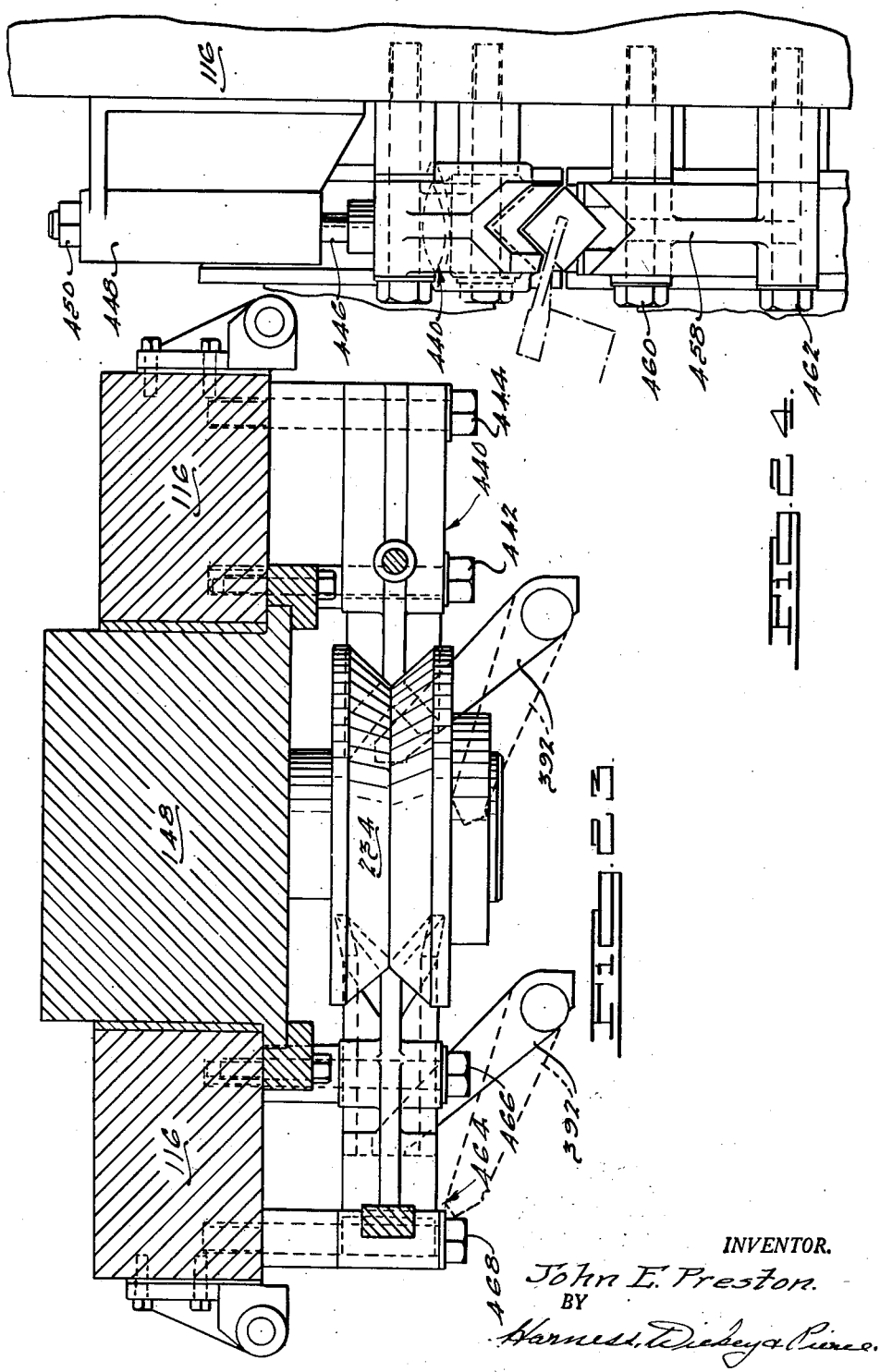

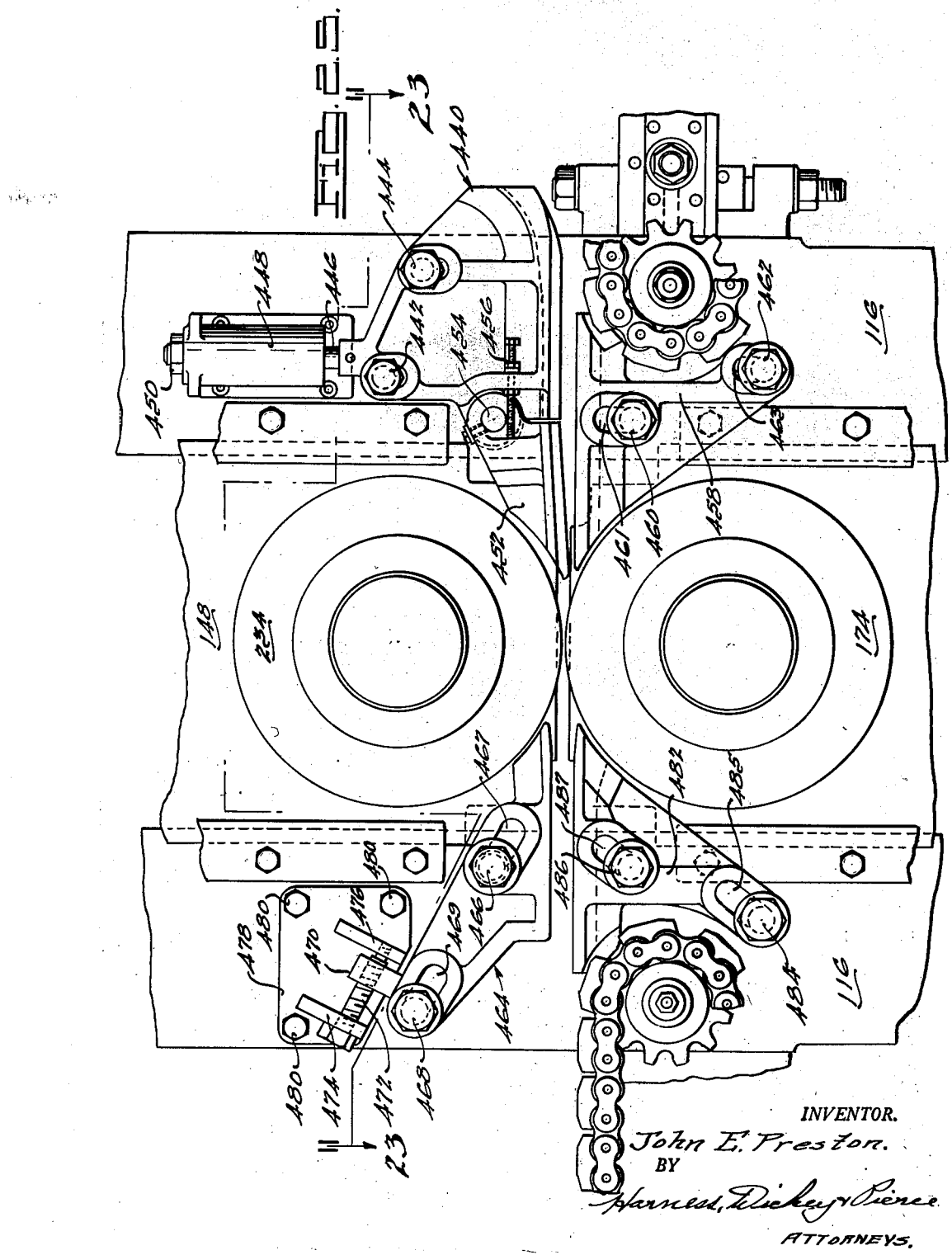

Feb. 12, 1952  J. E. PRESTON  2,585,677
ROLL FORGING MACHINE
Filed Jan. 15, 1945  21 Sheets-Sheet 21
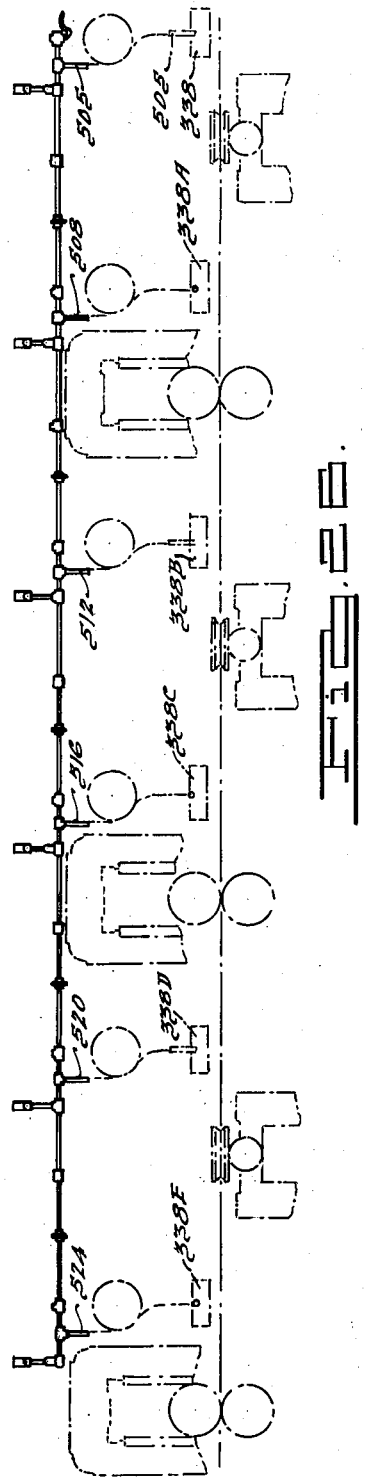
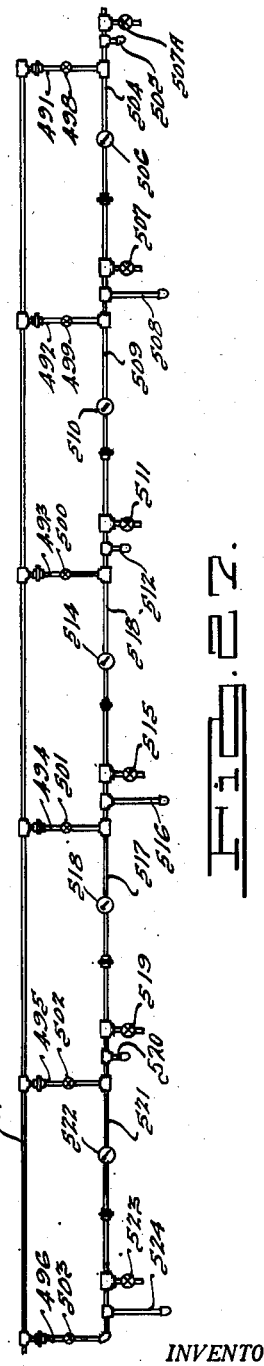
INVENTOR.
John E. Preston.
BY
Harness, Dickey & Pierce.
ATTORNEYS.

Patented Feb. 12, 1952

2,585,677

UNITED STATES PATENT OFFICE 2,585,677

ROLL FORGING MACHINE

John E. Preston, Pittsburgh, Pa., assignor to Crucible Steel Company of America, Midland, Pa., a corporation of New Jersey Application January 15, 1945, Serial No. 572,927

6 Claims. (Cl. 80—56)

This invention relates to a mill for roll-forging short billets into semifinished forging shapes.

The main objects of this invention are to provide a roll-forge mill which will give continuous and satisfactory operation; to provide a roll-forge mill which will have a minimum of interruption to its operation; to provide a roll-forge mill in which the workpieces are fed to the die rolls in accurate registration with the impressions therein; to provide a roll-forge mill in which differences in over-all length of the billets will not disturb or affect the correct and accurate registration of the billet with the impressions in the die rolls; to provide a roll-forge mill in which the workpiece feeding means yields and goes through its cycle of operation when a cobble occurs without structural damage to the feed mechanism; to provide a roll-forge mill in which all feeding and transporting of billets rearwardly of a cobble may be stopped instantly when the cobble trouble occurs, thereby preventing a piling up and jamming of billets which might and usually does cause structural damage; to provide a roll-forge mill in which the billets are fed to the rolls with a smooth, steady, damped motion; to provide a roll-forge mill in which the billets are both fed into and ejected from the rolls of each stand by mechanism which is operated in timed relation to the impressions of that particular set of rolls; to provide a roll-forge mill in which the relative angular position of the two rolls of the mill stand may be readily adjusted with respect to each other; to provide a roll-forge mill in which the roll shafts supported thereby are rigidly maintained in parallel position during movement in their supporting frames; to provide a roll-forge mill having a plurality of roll stands in which the transporting of the billets to the first stand is synchronized with the rolls thereof; to provide a roll-forge mill which may be operated as either one or two mills, as desired; and to provide a roll-forge mill which may be easily and readily changed and adjusted from handling a certain form or shape of billet to another form or shape.

An illustrative embodiment of the invention is shown in the accompanying drawings, in which Figs. 1 and 2 together show, somewhat diagrammatically, a plan view of the general mill layout comprising two parallel rows of six mill stands each and with two heating furnaces for each row of mill stands;

Fig. 3 is a broken view, partly in elevation and partly in section, of the discharge end of the furnace conveyer, the transfer slide and the conveyer for transporting the billets to the first mill stand, and showing the synchronizer which regulates the flow of billets in timed relation to the first pair of rolls;

Fig. 4 is a fragmentary view, showing the actuating mechanism for operating the synchronizer;

Fig. 5 is a top plan view of an interstand work-conveyer with the work-conveying chain belt broken away from the top thereof;

Fig. 6 is a view in side elevation of the interstand conveyer shown in Fig. 5;

Fig. 7 is a view in elevation of a vertical mill stand as viewed from the front, with the work-conveyers, work-feed carriages, carriage-operating mechanism and carriage-supporting tracks removed for purposes of clarity;

Fig. 7A is an enlarged, fragmentary view in elevation of the roll-supporting bearing block adjusting mechanism;

Fig. 7B is a sectional view taken on the line 7B—7B of Fig. 7A;

Fig. 13 is a view in elevation of vertical and horizontal mill stands having the work-feed carriages and carriage-supporting trackways mounted thereon;

Fig. 14 is an enlarged, fragmentary view in elevation of the top portion of the mill stand as viewed looking in the direction indicated by the arrow 14 in Fig. 7;

Fig. 15 is a further enlarged, fragmentary, sectional view taken on the line 15—15 of Fig. 14 looking in the direction indicated by the arrows;

Fig. 16 is an enlarged, fragmentary, sectional view taken on the line 16—16 of Fig. 14 looking in the direction indicated by the arrows;

Figs. 18A and 18B are a wiring diagram showing the electrical control circuits for the feed fingers, conveyer motors and furnace feed. With Fig. 18A placed above and in line with Fig. 18B, circuits and mechanical elements on the two are aligned with each other;

Fig. 19 is an enlarged view in end elevation of a work-feeding carriage and feed finger as used to feed workpieces to a vertical mill stand;

Fig. 20 is a fragmentary, bottom plan view as seen from the line 20—20 of Fig. 19 looking in the direction indicated by the arrows;

Fig. 21 is a bottom plan view of the work-feeding carriage shown in Fig. 19, with the work-feeding finger broken away;

Fig. 22 is a sectional view taken on the line 22—22 of Fig. 21 looking in the direction indicated by the arrows;

Fig. 23 is a fragmentary, horizontal, sectional view through a mill stand side frame showing the guides which direct the workpiece to and from the die rolls, the section being taken on the line 23—23 of Fig. 25, looking in the direction indicated by the arrows;

Fig. 24 is a fragmentary view in end elevation of the structure shown in Fig. 23;

Fig. 25 is a fragmentary view in front elevation of the structure shown in Figs. 23 and 24;

Fig. 26 is a view, partly diagrammatic, of the air pressure lines and control valves for retracting the work-feed fingers of the carriages which serve one row of mill stands; and Fig. 27 is a top plan view of the piping shown in Fig. 26.

General mill plan

Figure 1:
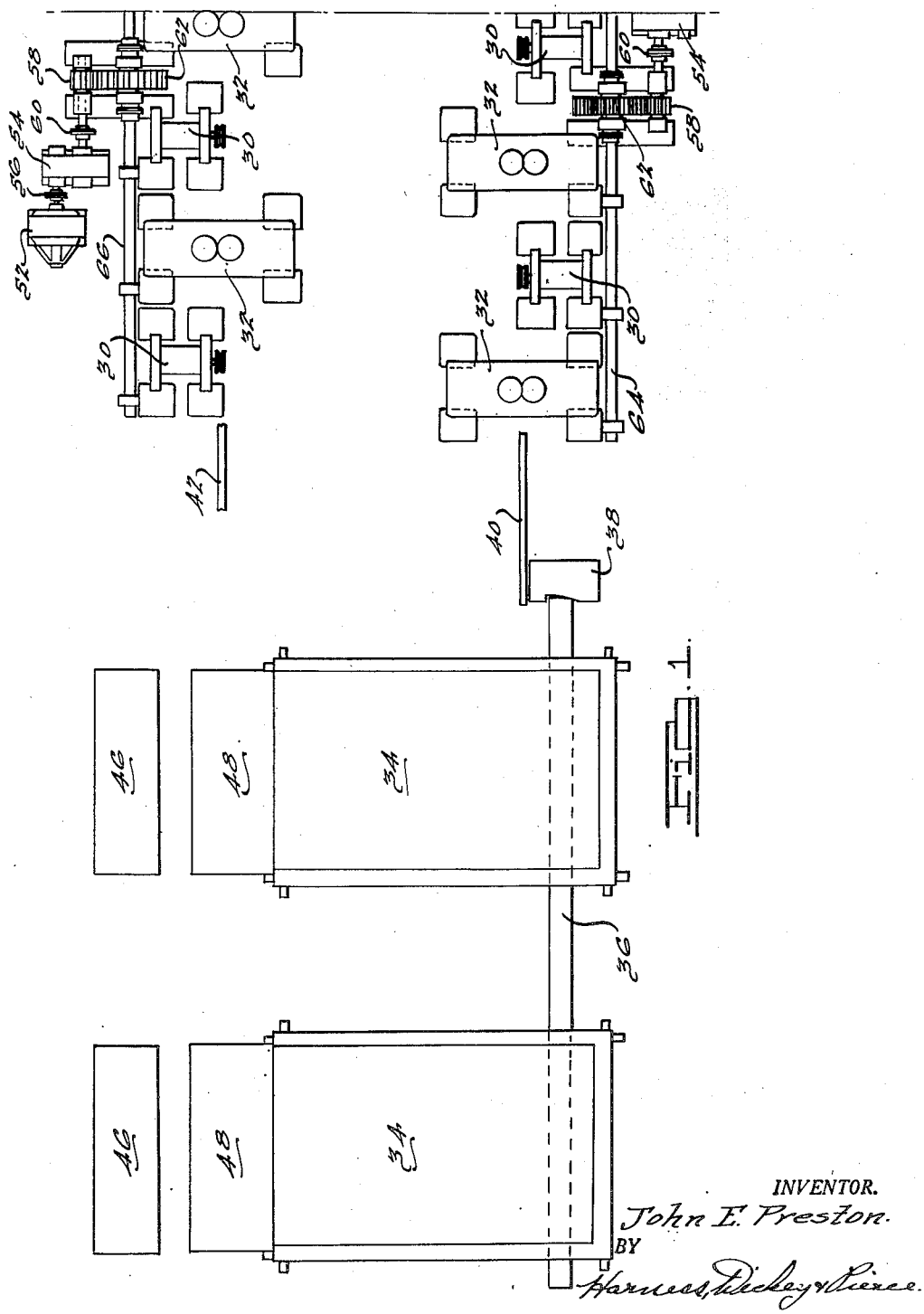
Figure 8:
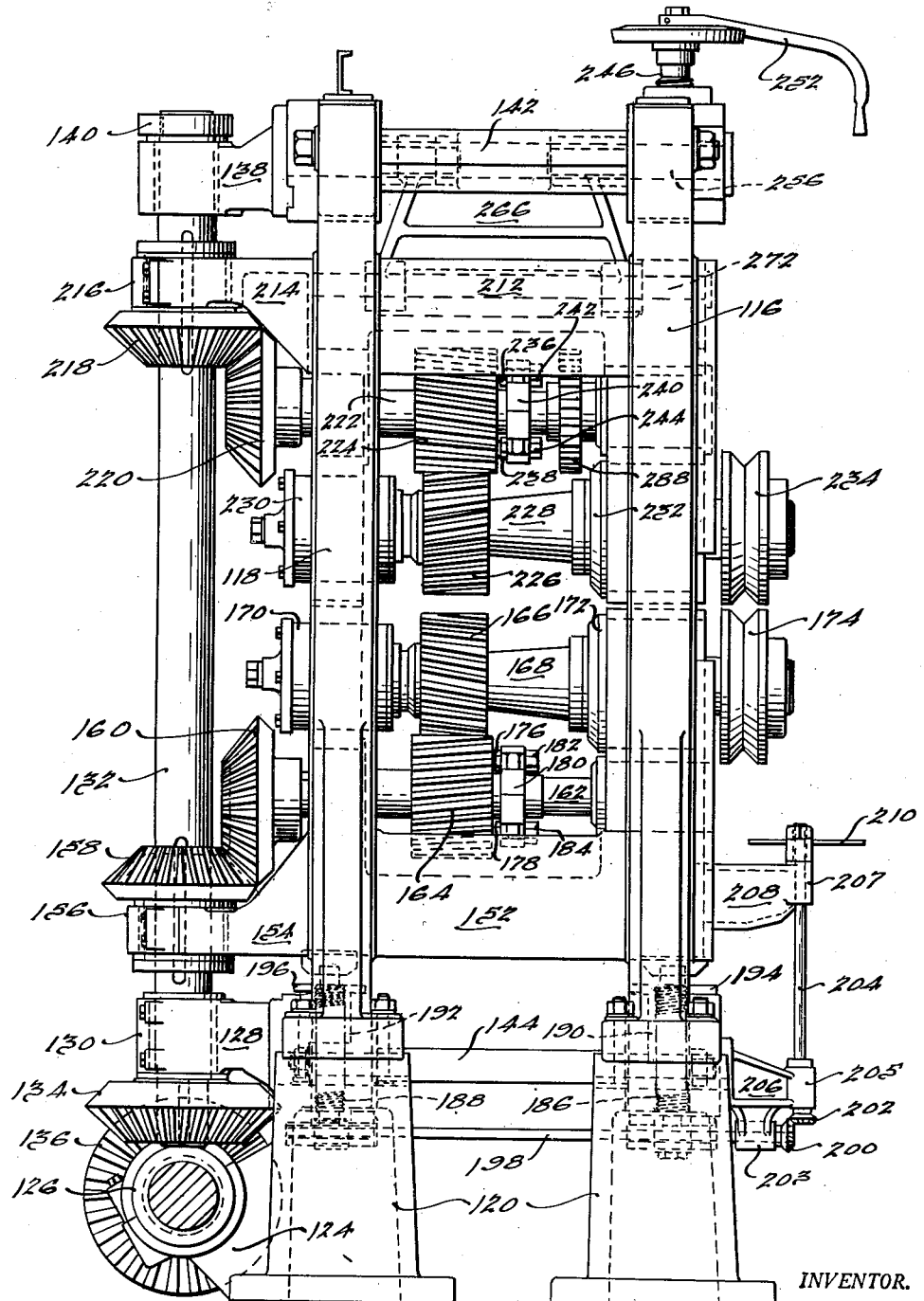
Fig. 8 is a view in elevation of a vertical mill stand taken at right angles to the view shown in Fig. 7 and showing particularly the roll drive mechanism for the stand, with tracks, carriages, conveyers, and other parts omitted for purposes of clarity.
Figure 9:
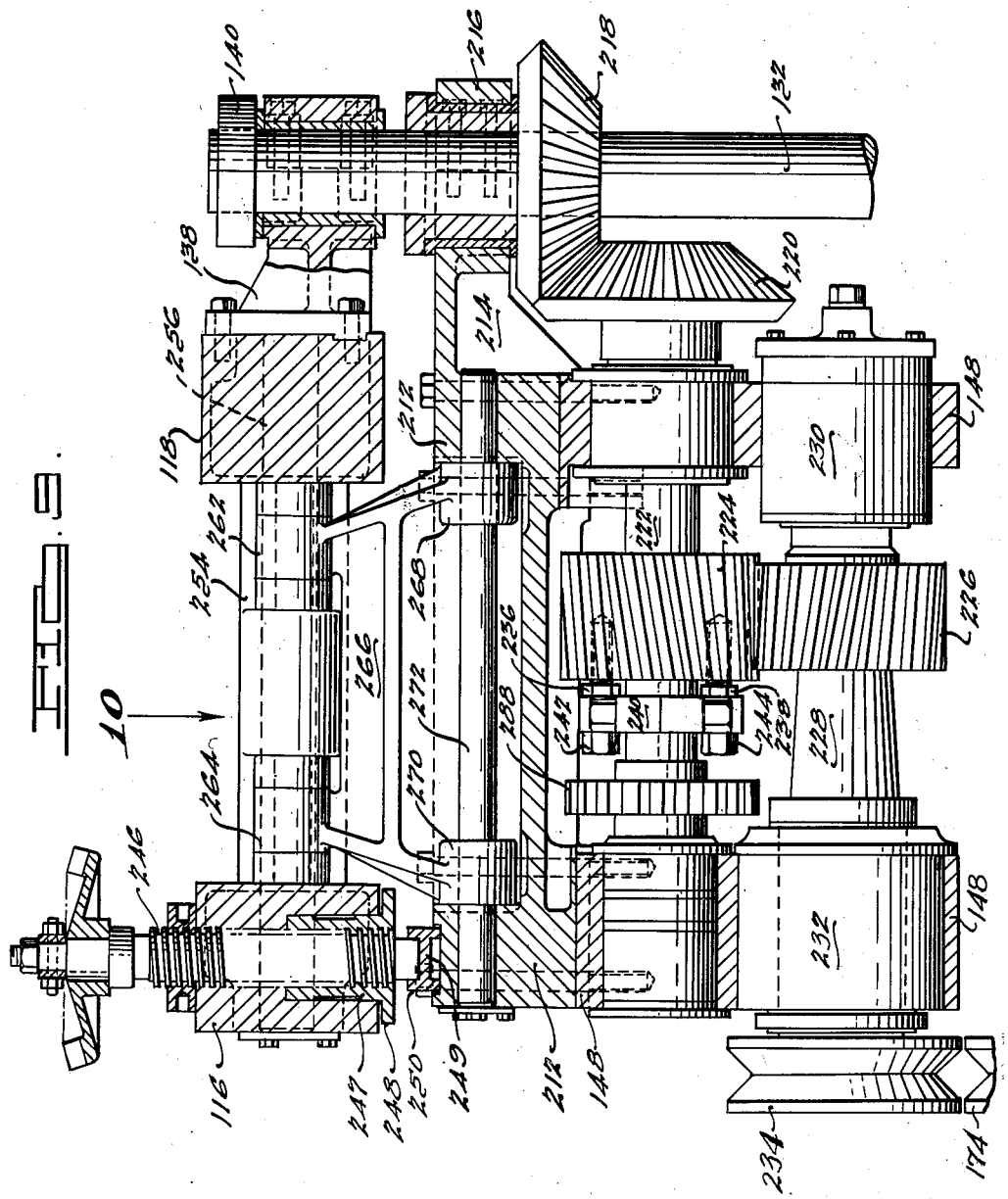
Fig. 9 is an enlarged, sectional view taken on the line 9—9 of Fig. 7.
Figure 10:
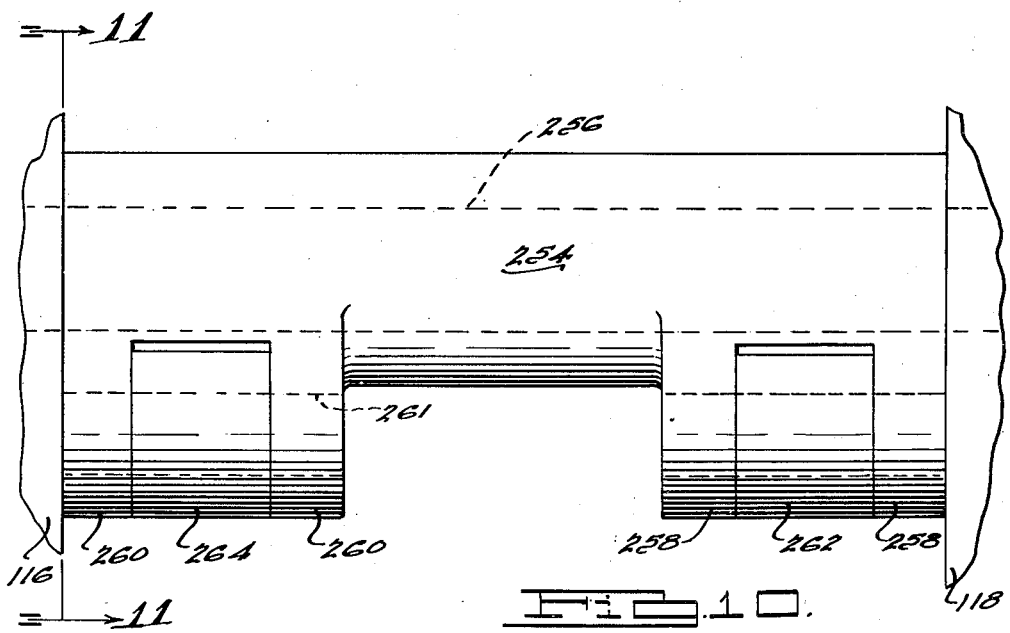
Fig. 10 is an enlarged, fragmentary, top plan view looking in the direction indicated by the arrow 10 of Fig. 9.
Figure 11:
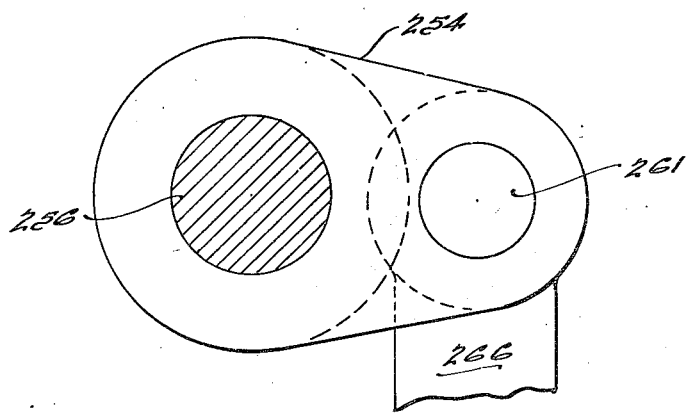
Fig. 11 is a fragmentary, sectional view taken on the line 11—11 of Fig. 10 looking in the direction indicated by the arrows.

The improved roll-forge mill illustrated in the drawings comprises two parallel rows of mill stands, each having three vertical mill stands generally designated 30 and three horizontal mill stands generally designated 32, arranged alternately, with the rolls and roll shafts of the stands 30 disposed at right angles to the rolls and roll shafts of the stands 32.

Two heating furnaces, generally designated 34, all of substantially identical construction, are provided for each row of mill stands. Each pair of furnaces 34 is provided with a workpiece conveyer 36, of the endless chain type, for transporting heated billets from the furnaces to an inclined transfer slide or ramp 38 which feeds the heated billets in lengthwise position to a workpiece conveyer 40. The conveyer 40 carries the workpieces to the first mill stand of each of the rows.

Separate, individually driven, interstand conveyers, generally designated 42, and shown in detail in Figs. 5 and 6 of the drawings, are provided for carrying the workpieces from one mill stand to the next. As shown in Fig. 2 of the drawings, a cross conveyer 44 is provided for transporting workpieces from the end of one row of mill stands to the conveyer 40 of the other row of mill stands and which may be used optionally so that the mill may be operated as two independent six-pass mills or may be operated as one twelve-pass mill.

In the event the workpieces should have to be reheated before passing through the second row of six mill stands, the cross conveyer 44 may be positioned to discharge the workpieces to the adjacent furnace 34 for reheating. In the event that is done, the workpieces, after being reheated, are discharged and transported to the other row of mill stands by way of the furnace conveyer 36, ramp 38, and feed conveyer 40.

All the heating furnaces 34, as heretofore mentioned, are substantially of identical construction and are provided with workpiece hoppers 46 from which billets are fed automatically to the aprons 48 which project from the front ends of the furnaces. The furnaces 34 are a conventional pusher type, having a plurality of floor grooves into which workpieces are fed in a sequence governed by a motor-driven timer, it being understood that so long as the timer motor is in operation, workpieces are sequentially fed into and discharged from the furnace. The timer motor (621) is diagrammatically shown in Fig. 18B, in combination with its interlocking control circuits.

Mill drive

All six mill stands of each row are driven in unison by one prime mover, comprising an electric motor 52 coupled to the worm of a worm-and-gear speed reducer 54 by a flexible coupling 56. The gear of the speed reducer 54 drives a gear pinion 58 through a flexible coupling 60, and the pinion 58 meshes with a driven gear 62. The gear 62 is mounted on a short shaft journaled in bearings at opposite sides thereof, and each end of the shaft is connected by a flexible coupling to the main mill drive shafts 64 and 66. The shafts 64 and 66 extend substantially equal distances in opposite directions from the gear 62, and each drives three mill stands.

It will be understood, of course, that a greater or lesser number of mill stands may be arranged in each row, depending upon the requirements of the work to be done and the number of operations to be performed on the workpieces. The main mill drive shafts 64 and 66 are, of course, journaled in suitable bearings, as is customary in multiple stand mills of this general type, and it will be understood that the general layout, as shown in Figs. 1 and 2 of the drawings, is somewhat diagrammatic, inasmuch as general line drives of multiple stand mills are well known.

Workpiece synchronizer

As shown in detail in Figs. 3 and 4, the furnace conveyer 36 discharges the heated billets to the inclined transfer ramp 38 which feeds them to a conveyer 40 in lengthwise position. The conveyer 40 is inclined upwardly from the point at which it receives the billets from the ramp 38 to a point where it passes over an idler sprocket 68 journaled on a conveyer supporting frame 70. From this sprocket on the conveyer 40 is disposed substantially horizontally; and at the point where the change of direction occurs, a synchronizer is provided for temporarily retarding the movement of the billets so that they are fed to the first mill stand one by one in timed relation to the impressions of the die rolls of that stand.

The workpiece billets 69 are of rectangular cross section with substantially flat or "square" ends and rest by gravity upon the top, V-shaped surface of the conveyor links in edgewise position, i. e., with two diagonal corners vertically aligned and the other two horizontally aligned. At the point where the conveyer changes direction, the billet resting thereon also changes direction, thus forming a V-shaped gap 67 between it and the succeeding billet, as clearly shown in Fig. 3. The gap 67, caused by the change of direction, is utilized by the synchronizer.

The synchronizer comprises a stop plate 71 located in the path of travel of the billets slightly in advance of the point where the conveyer 40 breaks as it passes around the idler sprocket 68, and in position to drop into the gap 67 when the gap moves into registry with the stop.

The bottom edge of the stop plate 71 is provided with an inverted ninety-degree V-shaped notch 73 which straddles the top edge of a billet lying on the horizontal run of the conveyor and which may ride thereon until the rear end of such billet passes therebeyond. The cam control for the stop may be so arranged as to hold the stop plate slightly above the billet instead of riding thereon in the event frictional contact of the stop plate has any tendency to hold the workpiece back from being transported by the conveyor.

When the billet under the stop plate passes therebeyond, the plate 71 drops by gravity into the gap 67, and due to the forward end of the oncoming billet being projected in continuation of its path of travel on the inclined portion of the conveyor, such forward end is at a higher level than the top of the preceding billet which is resting on the horizontal run of the conveyor.

Due to the inclination of the oncoming billet, its forward end, in horizontal projection, is diamond-shaped with its long axis horizontal. The ninety-degre notch 73 of the stop plate, when presented to this diamond-shaped face, insures a secure contact therewith well down from the top corner of the workpiece at each side of its center by the lower edges of the stop plate portions at each side of the notch, whereas a stop plate without the notch 73 might be cammed upwardly and ride over the top corner of an oncoming billet where such top corner is somewhat rounded. The stop 71 is rigidly mounted on the outer end of one arm of a bell crank lever 72 which is journaled for rocking motion on fixed pivots 74. The outer end of the other arm of the bell crank lever 72 is pivoted at 76 to one end of a push rod 78, the opposite end of which, as shown in Fig. 4, is pivoted at 80 to the lower end of a lever arm 82. The upper end of the lever arm 82 is journaled on a fixed pivot 84 on the first mill stand, and intermediate its ends is provided with a roller 86 which bears against a cam 88.

The cam 88 is keyed to a shaft 90 journaled on, and driven by, and in timed relation to, the first mill stand so that the billets traveling on the horizontal portion of the conveyor 40 are moving in timed relation to the impressions in the rolls of the first mill stand. They also move in timed relation to the workpiece feeding mechanism 92 operated by the first mill stand, one of these workpiece feeders being shown in Fig. 3 with a work feeding finger 392.

The supporting surfaces of the work-transporting conveyor 40 are preferably V-shaped and of the same general type and construction as the work-supporting surfaces of the interstand work conveyers generally designated 42 and shown more in detail in Figs. 5 and 6.

An independent, electric motor drive (not shown) is provided for the conveyor 40 with suitable speed reduction mechanism, as is common with conveyers of this type.

Interstand work-conveyers

Referring to Figs. 5 and 6, the interstand conveyers 42 comprise an elongated frame 94 adjustably supported at its opposite ends by brackets 96 and 98 which permit limited vertical adjustment of the conveyor so that the workpieces are delivered in proper relation to the die rolls and may be varied for different sized sections of workpieces. The framework 94 supports a pair of axially spaced chain-driving sprockets 100 and 102 and similar idler sprockets 104 and 105 at the opposite end theerof. The sprockets 100, 102, 104, and 105 carry a conveyer belt or chain of the endless type, which consists of two spaced, parallel runs of link chains pinned together at the link joints. The middle portions of the link pins pass through the bases of the support elements 43, the top surfaces of which are V-shaped, as shown most clearly in Fig. 5.

The sprockets 100 and 102 are driven through a chain sprocket 106, chain 108, and chain driving sprocket 110 which is keyed on the output shaft of a speed reducer 112. The input shaft of the speed reducer 112 is coupled to the armature shaft of an electric motor 114 so that all the interstand conveyors are independently driven and are not synchronized in precise, accurately timed relation to the die rolls of the adjacent mill stands.

Mill stands

Referring to Figs. 7 to 11 inclusive, it will be understood that all of the mill stands are of substantially identical construction, except that alternate ones are arranged vertically and horizontally so that the axes of the die rolls of one stand are perpendicular to the axes of the die rolls of the next stand. For the purposes of illustration, a vertical stand, as shown in Figs. 7 to 11 inclusive, has been selected for a detailed description which will suffice for all.

In the form illustrated, a pair of vertically disposed, spaced, parallel side frames, generally designated 116 and 118, are secured on the top ends of four pedestals 120 by tie-down bolts 122. The upper and lower ends of the side frames 116 and 118 are rigidly secured together by horizontally extending tie rods 142 and 144 respectively.

One of the pedestals 120 of each mill stand is provided with an integrally formed half-bearing 124 which, with a bolted-on bearing cap 126, forms a journal for the main drive shaft 64—66 which drives all of the mill stands in unison.

The side frame 118 is provided with an integrally formed bearing support 128 having a cap 130 for journaling a vertically disposed shaft 132 to the lower end of which is keyed a bevel pinion 134. The pinion 134 meshes with and is driven by a bevel pinion 136 keyed to the main drive shaft.

The upper end of the side frame 118 is also provided with a horizontally extending bearing bracket 138 in which the upper end of the shaft 132 is journaled. The shaft 132 protrudes beyond the upper side of the bearing to receive a collar 140 for supporting the shaft 132 against downward axial movement.

The side frames 116 and 118 each have substantially rectangular elongated openings or windows therein, the opposed vertical faces of each of which are parallel and serve as guideways for vertically slidable upper and lower bearing blocks 148 and 150 respectively.

The lower bearing blocks 150, in each side frame, are rigidly bolted to a horizontally disposed bridge member 152 which spans the space between the side frames and which is also vertically slidable in the guideways thereof. The bridge member 152 is provided with a horizontally extending, integrally formed bracket portion 154 which, with a cap 156, forms a journal bearing for a bevel pinion 158. The pinion 158 is restrained against axial movement relative to its bearing, but is keyed to, although axially slidable upon, the shaft 132.

The pinion 158 meshes with and drives a bevel pinion 160 keyed to and fixed on one end of a horizontally disposed countershaft 162 which is journaled in the lower bearing blocks 150 in each of the side frames 116 and 118. The countershaft 162 carries a helical gear 164 keyed to, but axially adjustable thereon, which meshes with and drives a helical gear 166 keyed and fixed to a lower roll shaft 168. The shaft 168 is journaled in bearings 170 and 172, carried by the lower bearing blocks 150, and one end of the shaft protrudes beyond the side frame 116 and has detachably fixed thereon a die roll 174.

Means are provided for axially adjusting the gear 164 on the shaft 162 and comprise a pair of headed studs 182 and 184 extending axially from one side of the gear and positioned at diametrically opposite points with respect to the axis thereof. The studs 176 and 178 extend through a two-piece collar 180 clamped in an annular groove formed in a shaft 162, and are provided with nuts 176 and 178, respectively, for abutting against the inner side of the collar 180. Axial adjustment of the gear 164 is secured by loosening the nuts 176 and 178, rotating the studs 182 and 184 in the appropriate direction, and then tightening the nuts. It is obvious that axial adjustment of the countershaft drive gear 164, due to its helical teeth, will rotate the gear 166, roll shaft 168 to which it is keyed, and thereby angularly adjust the die roll 174 to accurately position the die cavity therein with respect to its companion or co-operating die roll.

Means are provided for adjusting the bridge member 152, and the lower bearing blocks 150 carried thereby, vertically in the side frames and comprise vertically disposed screws 186 and 188 threaded through sleeves 190 and 192 respectively which have radially extending flanges 194 and 196, respectively. The screws 186 and 188 may be rotated in unison for securing vertical adjustment by means of a shaft 198 which has worms fixed thereto for meshing with worm gears carried on the lower ends of the screws.

The shaft 198 may be conveniently rotated from the floor of the mill through the medium of a bevel gear 200 fixed to one end thereof which meshes with a similar bevel gear 202 fixed to the lower end of a vertical shaft 204. The end of the shaft 198, adjacent its bevel gear, and the lower end of the shaft 204, are journaled at right angles to each other in bearings 203 and 205 carried by a bracket 206 affixed to the side frame 116. The upper end of the shaft 204 is journaled in a bearing 207 integrally formed on a bracket 208 which also is affixed to the side frame 116. The upper end of the shaft 204 protrudes beyond the bearing 207 and above the mill floor 210 so that a wrench or tool may be readily applied thereto for rotating the shaft.

The side frames 116 and 118, at their upper ends, also slidably support for vertical movement the upper bearing blocks 148 which are rigidly bolted to a horizontally extending bridge member 212 so that the bearing blocks move as a unit. The bridge member 212 has an integrally formed bracket 214 which extends horizontally outside of the side frame 118 and which, with a cap 216, forms a journal bearing for a bevel pinion 218. The pinion 218 is restrained against axial movement relative to its bearing, but is nonrotatably keyed to the shaft 132, although free to slide axially thereon.

The pinion 218 meshes with and drives a bevel pinion 220 fixed on one end of a horizontally disposed countershaft 222 which is journaled in the upper bearing blocks 148. The countershaft 222 has a helical gear 224 keyed thereto, but axially adjustable thereon, which meshes with and drives a helical gear 226 rigidly fixed on an upper roll shaft 228. The shaft 228 is journaled in the upper bearing blocks 148 by bearings 230 and 232.

The roll shaft 228 extends outwardly beyond the side frame 116 and has a die roll 234 detachably fixed thereon which is aligned with and co-operates with the die roll 174 in the usual manner.

The die rolls 174 and 234 are shown with uniform V-shaped grooves in their peripheries, but it will be understood that these die rolls are provided with contoured depressions of various shapes and depths, depending upon the nature of the product to be made.

The countershaft helical gear 224, in the same manner as the countershaft gear 164, is provided with screws 242 and 244 which extend axially therefrom through a two-piece collar 240 fixed in an annular groove of the shaft 222. The screws 242 and 244 are provided with nuts 236 and 238 for adjusting the axial position of the gear 224 in the same manner as heretofore described with respect to the lower countershaft gear. As heretofore stated with respect to the lower die roll 174, it is obvious that axial adjustment of the countershaft drive gear 224, due to its helical teeth, will rotate the gear 226, roll shaft 228 to which it is keyed, and thereby angularly adjust the die roll 234 to accurately position the die cavity therein with respect to the cavity in the co-operating die roll 174.

The bridge member 212 and bearing blocks 148 carried thereby are held down in their side frames by a single screw-down carried by the side frame 116 and which comprises a vertically disposed screw 246 threaded through a sleeve member 247 having a radially extending flange 248. The lower end of the screw 246 depends from the flange 248 and bears against the horizontally extending web 249 of a cylindrical shear block 250 of H vertical cross section which, in turn, is seated in a shallow depression formed in the top surface of the bridge 212. Rotation of the screw 246 is by a hand lever 252 after the manner of screw-downs on rolling mills in general.

Means are provided for maintaining the axes of the roll shaft 228 and countershaft 222 in fixed, angular relation to the horizontal and to the side frames, and parallel to the lower roll and countershafts, which comprises a substantially horizontally disposed link 254 pivoted on a shaft 256, one end of which is anchored in the side frame 116 and the other end of which is anchored in the side frame 118. The link 254 is of considerable axial length relative to the length of its lever arm and is of extremely heavy, rigid construction.

The link 254 extends substantially horizontally from the shaft 256, and at its opposite ends is provided with bifurcated portions 258 and 260 which embrace the upper ends 262 and 264, respectively, of a substantially vertically extending, heavy, rigid link 266. Pivot pins 261 are provided through the upper ends 262 and 264 of the link 266 and the bifurcated portions 258 and 260 of the link 254, so that pivotal action is permitted therebetween. The lower end of the link 266 terminates in widely spaced bearing portions 268 and 270 which are pivoted on a horizontal shaft 272 anchored in the bridge member 212.

Due to the foregoing construction, the upper bearing blocks 148 and bridge 212 are constrained to move as a unit, and the shafts 222 and 228 are maintained in parallel relation to the shaft 256, even though held down by only one hold-down screw acting through one breaker block and side frame.

Means are provided for prestressing the side frames 116 and 118 and comprise a pair of keys 274 and 276 of rectangular cross section rigidly anchored in shallow grooves extending transversely across the opposed faces of the guideways for the bearing blocks 148 and 150 of the side frames 116 and 118. The keys are preferably at right angles to the guideways and are secured by cap screws 278, as shown most clearly in Figs. 7A and 7B.

The upper and lower edges of the keys 274 and 276 have bearing against wedge blocks 280 and 282 of rectangular cross section, which are wedge-shaped by having their outer edges at an angle with respect to their inner edges which bear against the keys. The outer sloping edges of the wedges 280 and 282 bear against similarly sloping edges formed at the opposite ends of bars 284 and 286 which are rigidly secured to the bearing blocks 148 and 150, respectively. These bars 284 and 286 also serve as tie bars and braces for their respective bearing blocks.

The wedges 280 and 282 are moved lengthwise by hexagonal bars 288 and 290, respectively, which have their opposite ends threaded into the wedges by right- and left-handed threads with the bar extending from one side frame across to the other. The shoulders at the ends of the hexagonal portion of the adjusting bars 288 and 290 bear against hardened steel washers 292 interposed between the shoulders and plates 293 and 294 secured to the respective inner faces of the side frames 116 and 118.

The plate 293 is provided with two integrally formed bosses 295 and 297 having blind end holes therein for receiving spring-pressed plungers 299 which bear against the flat sides of the hexagonal portions of the adjusting bars. The plungers 299 retain the bars in adjusted position while permitting rotation thereof with a suitable tool by camming the plungers against their respective springs.

By having the fixed bars or keys 274 and 276 approximately midway of the side frames, the upper and lower ends of the side frames may be independently prestressed by the action of the jack screws forcing the bearing blocks 148 and 150 thereagainst through the medium of the adjustable wedges 280 and 282. Thus the side frames may be stressed to a degree equal to or greater than the stresses to which they would be subjected during normal rolling operation, and both the upper and lower rolls may be independently so adjusted. Thus it is possible to maintain the roll centers so that the workpiece-receiving space therebetween can be maintained in alignment with the guides which are mounted on the side frames.

*Workpiece feeder and ejector*

Referring particularly to Figs. 8, 9, 12 to 17 inclusive and 19 to 22 inclusive, the upper countershaft 222 is provided with a gear 289 keyed thereto which meshes with and drives an idler gear 291 journaled on a stub shaft 293 which is carried by a bracket 295 bolted to the inner face of the side frame 116. Stub shaft 293 is sufficiently long to permit the idler gear 291 to be slid axially out of mesh with the gear 289 and reengaged therewith without dropping off the free end of the shaft.

The gear 291 meshes with and drives a gear 296 keyed to the camshaft 90 journaled in brackets 300 and 302 secured in horizontal alignment to the outer sides of the side frames 116 and 118, respectively. The shaft 90 has a pair of contour cams 304 and 306 rigidly keyed thereon for oscillating a pair of lever arms 310 and 312 integrally formed on a split sleeve 314 which is keyed upon and frictionally grips a rocker shaft 316. Cap screws 318 are provided for tightening the sleeve 314 about its shaft.

The arms 310 and 312 are disposed at angles to each other so as to extend downwardly at opposite sides of the camshaft 90, and the outer ends of the arms are provided with cam followers 320 and 322 which ride upon the outer surfaces of the cams 304 and 306 respectively, as shown most clearly in Figs. 14 and 16.

The rocker shaft 316 is journaled in aligned bearing portions 317 and 319 formed in the upper ends of the brackets 300 and 302 respectively, suitable liners being provided for serving as bearings for the shaft.

One end of the shaft 316 extends outwardly from the side frame 116 and has the upper end of a depending lever 324 journaled thereon. A tapered portion of the shaft 316 extends beyond the bearing portion of the arm 324 and has one end of a driving arm 326 rigidly secured thereon by a key 328 and nut 330. The lower end of the arm 324 is pivoted at 332 to one end of a pitman link 334, the other end of which is pivoted at 336 to a workpiece transport ejector carriage generally designated 338.

The pitman 334 is reciprocated through a yielding drive which comprises a helical compression spring 340 surrounding a shaft 342, the lower end of which is pivoted at 344 to the lower end of the arm 324 in slightly spaced relation above the pivot point 332 and the other end of which slides through a sleeve 346 pivoted at 348 between the bifurcated end 350 of the driving arm 326. The upper end of the rod 342 is threaded to receive an adjusting nut 352 and lock nut 354. The opposite ends of the spring 340 abut against the sleeve 346 and a shoulder 356 formed on the lower end of the rod 342, which end is provided with a transverse hole therethrough for receiving the pivot 344. The spring 340 is so designed as to permit, by compression thereof, the complete cycle of motion of the driving arm 326 without oscillating the arm 324 in the event the work transport carriage encounters abnormal resistance.

The work transport carriages 338 are provided in pairs for each mill stand, one carriage to feed the workpiece to the die rolls and the other carriage for ejecting the workpiece from the die rolls, so that feed of the workpiece to and ejection from each pair of rolls of each mill stand is in timed relation to the rolls of that particular mill stand. Each pair of carriages 338 is secured together by a tie bar 382 which is in the nature of a turnbuckle so that the work-feeding carriage may be accurately and precisely positioned to feed the workpiece into engagement with the rolls at the correct time relative to the roll impressions. Varying the length of the tie bar 382 also permits ready adjustment to accommodate different lengths and varying styles of workpieces.

Transport carriages 338 are all of substantially identical construction, and therefore a detailed description of one will suffice for all.

Figure 12:
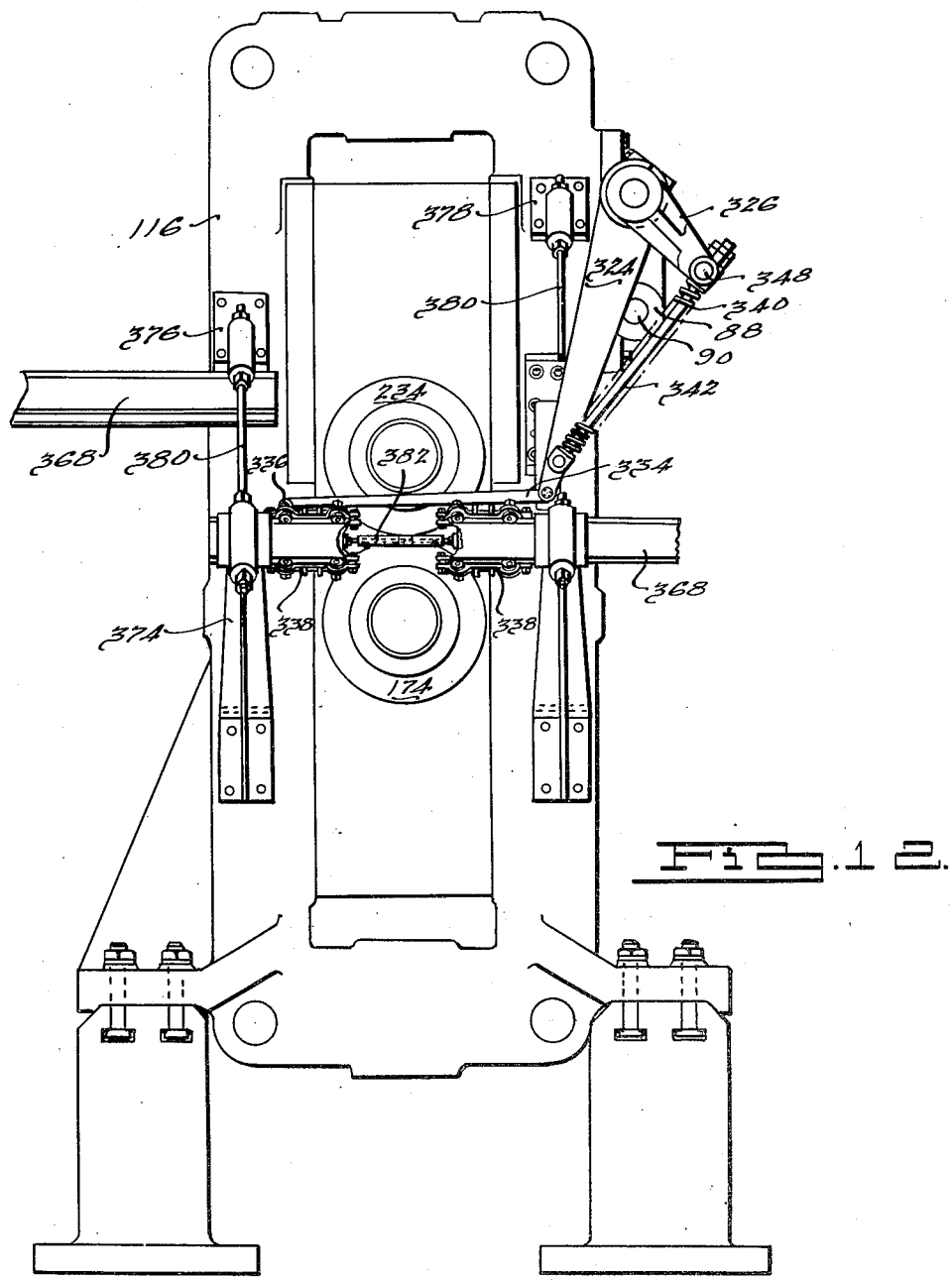
Fig. 12 is a view in elevation showing a vertical mill stand with the work-feeding carriages mounted on trackways and the carriage-operating mechanism.
Figure 17:
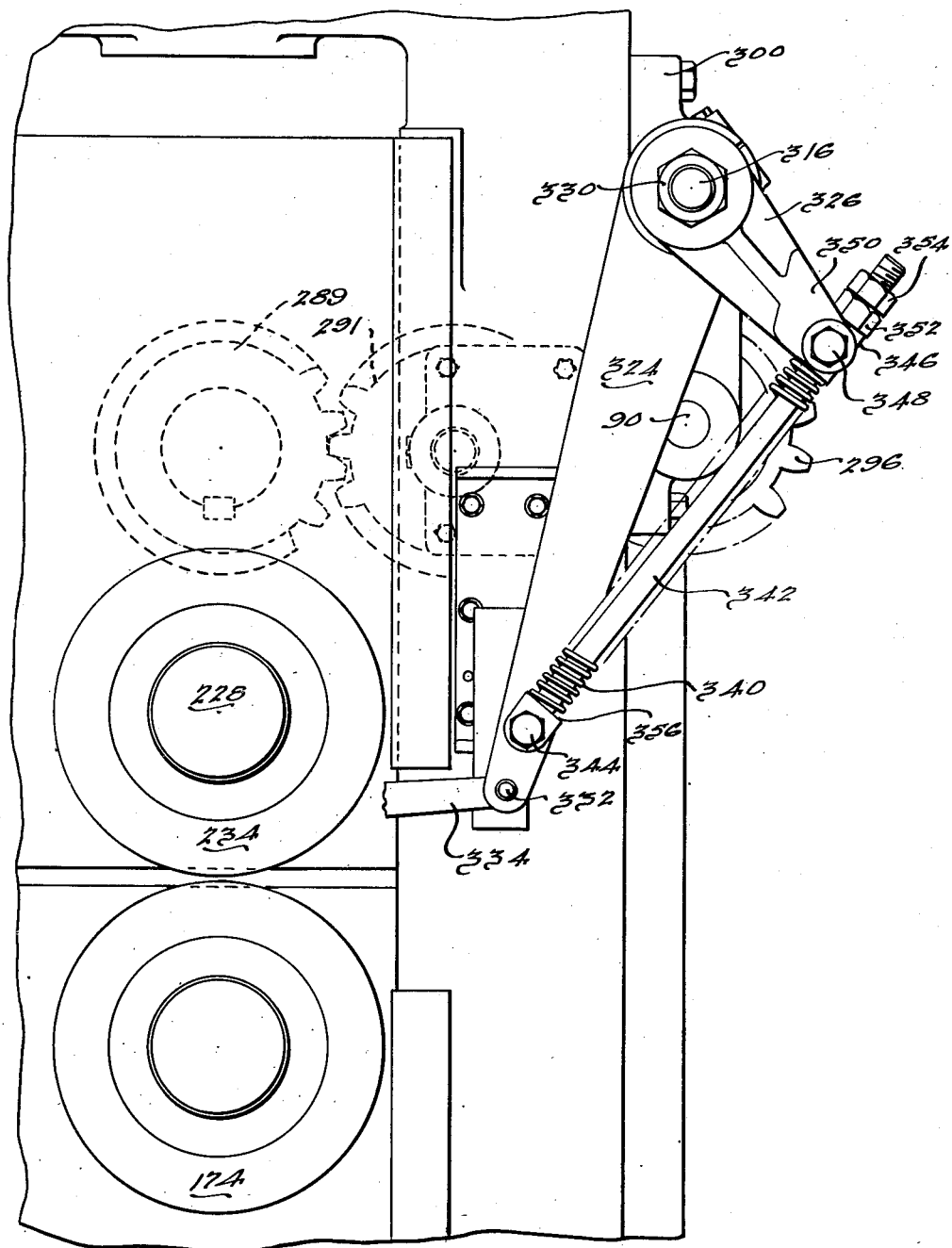
Fig. 17 is an enlarged, fragmentary view in elevation looking in the direction indicated by the arrows 17—17 of Fig. 14.

Referring particularly to Figs. 19, 20, 21, and 22, each carriage comprises a base portion 358 of generally rectangular shape, which is provided at opposite ends with pairs of inwardly inclined rollers 360 and 362 which bear against the sloping side edges 364 and 366, respectively, of a horizontally disposed trackway 368. The base portion 358 is also provided with aligned rollers 370 and 372 which bear against the opposite marginal edges of the track in angularly opposed relation to the rollers 360 and 362, as shown most clearly in Fig. 19. As shown in Figs. 12 and 13 the trackway 368 for the vertical mill stand is adjustably mounted on the end frame 116 by brackets 374, 376, and 378 and a tie rod 380. Also, the trackway 368 for the carriages which feed work to and eject work from a horizontal mill stand is held by the identical brackets 374, 376, and 378 and tie rod 380 as used for the vertical mill stands. Two sets of tie rods and supporting brackets are provided on each mill stand for each trackway, and, as shown in Fig. 12, the two work transport carriages are coupled together to be driven in unison by the adjustable tie rod 382.

The base portion 358 of the carriage has an integrally formed bracket-like extension 384, the outer head end 386 of which serves as a journal bearing for a shaft 388. The shaft protrudes at both sides of the head 386, and one end thereof has the base end 390 of a work-feeding finger 392 keyed thereon and secured by a nut 394.

The other end of the shaft 388 carries a short lever arm 396 keyed thereto, a lever arm 398 journaled thereon, and a short lever arm 400 keyed thereto, these elements being disposed in the order named and being arranged side by side in abutting relationship. The outer end of the lever 396 is provided with a transversely extending toe 402 which is disposed in the path of movement of the outer end of the lever 398 so as to be engaged thereby for rotating the shaft in one direction while permitting the shaft to be rotated in that same direction without moving the lever 398. The outer end of the lever 400 has one end of a helical tension spring 404 attached thereto, the other end of which is anchored to a clip 406 secured on the carriage base.

Means are provided for rotating the shaft 388 to move the feed finger 392 out of workpiece-engaging position, as shown in dotted lines in Figs. 3 and 23. The outer end of the lever 398 is pivotally connected at 408 to one end of a link 410, the other end of which is pivotally connected at 412 to the outer end of a piston rod 414. The inner end of the piston rod 414 is provided with a piston 416 slidable within a cylinder 418 integrally formed on a base plate 420 which is rigidly secured to the carriage bracket extension 384 by cap screws 422. The piston rod 414 is axially bored from its inner end to receive a helical compression spring 424 for normally maintaining the piston rod in an extended position, as shown in Fig. 22.

The cylinder 418 at the end opposite to the piston rod is closed by a vented cylinder head 426 which carries a guide pin 428 for supporting the adjacent end of the compression spring 424. A conventional packing gland and nut 430 are provided for sealing the piston rod at the point it passes through the cylinder end wall. The cylinder, at the end adjacent the piston rod packing, is provided with a radial bore 432 which is threaded to receive a pipe coupling 434 for a fluid conducting pipe 436.

It will be noted in Fig. 19 that the bracket extension 384 is angularly disposed with respect to the plane of the carriage base 358 so that the work-feed finger 392 is inclined downwardly with respect to the horizontal. This arrangement is provided so that, as shown in said view, the outer work-engaging end of the finger 392 extends down into the V-shaped troughlike conveyer elements so as to engage billets of relatively small cross section at a point somewhat near their centers.

However, the carriages which feed workpieces to the horizontal mill stands and eject workpieces from both horizontal and vertical mill stands, have bracket portions 384 which project at right angles to the plane of the base 358 so that the work finger supporting rod 388 is parallel to the base 358 and the work-feed finger 392 is at right angles to the carriage base, as shown in Fig. 13 of the drawings. Except for this slight angularity of the bracket extension 384, the carriages for the horizontal and vertical mill stands are identical.

As shown particularly in Figs. 23, 24, and 25 of the drawings, means are provided for first guiding and then frictionally engaging and temporarily restraining the workpieces prior to being fed into position to be engaged by the die rolls and comprises a guide generally designated 440 mounted on the side frame 116 by studs 442 and 444 which pass through vertical slots formed in the guide.

The upper end of the guide 440 is provided with a vertically extending shank or rod 446 which is slidable in a sleeve 448 secured to the side frame. The upper end of the rod protrudes above the sleeve 448 and is threaded to receive an adjusting nut 450 by which the normal position of the shoe is positioned with respect to incoming workpieces and secured in adjusted position by tightening the screws 442 and 444.

The bottom face of the guide 440 is of inverted V shape to embrace the oppositely diverging sides of a rectangular workpiece when presented thereto on edge, but it will be understood that this face of the guide may be varied to best suit the particular shape of workpiece being passed through the mill and may vary from stand to stand as the shape of the workpiece is changed by the die rolls.

The rear end of the guide 440 has a drag shoe 452 pivoted thereto at 454, and an adjusting screw 456 is provided for limiting the downward swinging of the drag shoe, said shoe being free to swing upwardly above its pivot within a limited range.

The guide 440, with its drag shoe 452, co-operates with a lower guide member 458 which is rigidly held in adjusted position by studs or cap screws 460 and 462 which pass through vertical slots 461 and 463, respectively, provided in the guide member.

The drag shoe 452 functions not only to temporarily restrain and hold back the workpiece from entering into contact with the die rolls until moved by the feed finger 392, but also serves as a damping means during movement of the workpiece when actuated by the feed finger, thus causing the workpiece to take the true motion of the feed finger without chatter, and thus insuring accurate and precise registration of the workpiece with respect to the depressions in the die rolls. The shoe 452 is adjusted to position depending upon the size of the workpiece so that the workpiece is engaged and temporarily restrained from feeding movement while still resting partially upon the interstand conveyer 42, but is cammed upwardly when the workpiece is moved toward the rolls by the feed finger, the amount of movement of the shoe depending upon the adjustment of position of the shoe in accordance with the positioning of the adjusting screw 456.

It will be understood that the weight of the drag shoe is such that its gravitational urge will overcome the friction between the workpiece and the elements of the interstand conveyer, and after being cammed upwardly by the workpiece when it is fed into the rolls, it will again descend by gravity to its initial position as soon as the workpiece has passed therebeyond.

Guides are also provided at the discharge side of the rolls and comprise an upper guide generally designated 464 rigidly secured to the outer face of the frame 116 by studs 466 and 468 which pass through diagonally disposed slots 467 and 469, respectively, formed in the guide. The upper end of the guide 464 is provided with an integrally formed, upstanding lug or boss 470 threaded to receive an adjusting screw 472. The screw 472 is mounted in outstanding spaced lugs 474 and 476 integrally formed on a base plate 478 which is bolted to the outer face of the side frame 116 by cap screws 480. This is piloted at its lower end in lug 476 and is rotatably guided at its upper end in lug 474. The guide 464 is rigidly secured in adjusted position by tightening the screws 466 and 468.

The upper guide 464 co-operates with a lower guide generally designated 482 which is rigidly bolted in adjusted position to the outer face of the side frame 116 by studs or cap screws 484 and 486 which pass through slots 485 and 487 respectively, formed in the shoe. The slots are disposed so that as the shoe is adjusted upwardly it moves in toward the die rolls and, conversely, moves away from the rolls when adjusted downwardly so as not to interfere or contact with the die rolls while still having a portion extending a considerable distance inwardly between the rolls so as to engage and guide the workpiece shortly after its forward end begins to emerge from the rolls.

Curling or axial curving of the workpiece is eliminated or materially reduced by the provision of the guides 464 and 482, which also perform the function of guiding the workpiece into proper position onto the rear end of the next succeeding inner stand work-conveyer 42.

*Feed-finger control*

Referring particularly to Figs. 26 and 27, there is shown, somewhat diagrammatically, the fluid pressure lines for one row of six mill stands. A header fluid pressure line 490, adapted to have air or the like under pressure maintained therein at all times, is provided with six branch lines 491, 492, 493, 494, 495, and 496, one being provided for each mill stand shown diagrammatically in Fig. 26. Passage of fluid through the branch lines is governed and controlled by electrically operated valves such as solenoid valves 498, 499, 500, 501, 502, and 503 respectively.

All the branch lines 491 to 496 inclusive are connected to a second header line in which is interposed a series of check valves 506, 510, 514, 518, and 522 arranged so that by push-button control, fluid may be admitted to the cylinders of any pair of carriages at any mill stand, and when so admitted will also be admitted to the feed finger operating cylinders of all the carriages of all preceding mill stands. The branch 491 is connected through the solenoid valve 498 to a line 504 which has a branch 505 leading to one of the pipes 436 of a feed-finger operating cylinder 418 of carriage 338 of the first mill stand.

The line 504 extends forwardly through a check valve 506 to a take-off branch 508 and thence to the branch 492. Interposed in this line is a pipe T connected to a valve 507 which is cracked to the atmosphere. The take-off branch 508 is connected to the feed finger operating cylinders of the next succeeding mill stand carriages designated 338A.

Line 509 continues from the branch 492 through check valve 510 to a third take-off branch 512 and thence to the branch 493. Interposed in this line is a pipe T connected to a valve 511 which is cracked to the atmosphere. The take-off line 512 leads to the feed finger operating cylinders of the carriages 338B of the third mill stand.

A line 513 continues from the branch 493 through a check valve 514 to a fourth take-off branch 516 and thence to the branch 494. Interposed in this line is a pipe T connected to a valve 515 which is cracked to the atmosphere. The take-off branch 516 leads to the feed-finger operating cylinders of the carriages 338C of the fourth mill stand.

The line continues at 517 through a check valve 518 to a fifth-take-off branch 520 and thence to the crossover branch 495. Interposed in this line is a pipe T connected to a valve 519 which is cracked to the atmosphere. The take-off branch 520 leads to the feed-finger operating cylinders of the pair of carriages 338D of the fifth mill stand.

The line continues at 521 through a check valve 522 to a sixth take-off branch 524 and thence to the crossover branch 496. Interposed in this line is a pipe T connected to a valve 523 which is cracked to the atmosphere. The take-off branch 524 leads to the feed-finger operating cylinders of the pair of carriages 338E of the sixth and last mill stand.

In the operation of this feed-finger control, air under pressure is maintained at all times in the line 490, and the valves 498 to 503 inclusive are maintained in closed position. The check valves 506, 510, 514, 518, and 522 permit air to flow to the right, as viewed in Figs. 26 and 27 of the drawings, but prevent air from flowing to the left, and it is assumed that the direction of feed of work is from right to left, as viewed in these drawings. The valves 507A, 507, 511, 515, 519, and 523 are cracked to the atmosphere at all times so as to bleed air out of the lines with which they communicate.

In the event a cobble occurs at the third mill stand to which work is being fed by the carriages 338B, or for some other reason it is desired to stop the feeding of work at this point and in the preceding two mill stands, the valve 500 is opened by an operator pressing a button to close the circuit for energizing the solenoid of the valve. As described later, valves 499 and 498 are also opened by energization of their solenoids. The opening of this valve 500 permits air to flow into the take-off branch 512, thus admitting air under pressure to the feed-finger operating cylinders of the carriages 338B, thereby retracting the fingers from operative position so as not to engage the workpieces on the interstand conveyer. At the same time, air under pressure flows to the right through check valves 510 and 506 to take off branches 508 and 505, and thence to the feed finger retracting mechanism of carriages 338A and 338, thereby rotating the feed fingers to inoperative position, as shown in dotted lines in Fig. 23.

After the cobble has been removed and it is desired to resume feeding of workpieces to the mill stands, the valve 500 is closed by the operator, and the valve 511, which is cracked open to the atmosphere, bleeds the air pressure from the line 512, thus permitting the feed fingers of the carriages 338B to be restored to their normal operating position. The solenoid valves 499 and 498 are then closed successively by the operator. Thereafter the valves 507 and 507A bleed the air pressure from the branch lines 506 and 505 respectively, releasing the pressure and permitting restoration of the feed fingers to normal position of the carriages 338A and 338.

In the same manner the feed to any mill stand and all preceding mill stands may be stopped, while permitting workpieces to be fed to all successive mill stands in normal manner. After elimination of the trouble the feed of workpieces to the affected mill stands is resumed successively, beginning with the most advanced stand, without disturbing the timing of the feed mechanism of those stands.

*Electrical control for feed fingers—conveyer motors and furnace feed*

Referring to Figs. 18A and 18B, an illustrative control system for controlling the starting and stopping of the previously mentioned motors 114 associated with the several interstand conveyers, for controlling the energization and deenergization of the air valves 498 through 503 associated with the previously described feed and ejector fingers, and for controlling the starting and stopping of the furnace feed, is diagrammatically shown.

In the drawings the conveyer motors 114 are given subscripts A through F to indicate their association, respectively, with the individual interstand conveyers, motor 114A being associated with the first conveyer, etc.

The illustrated control system employs a plurality of conventional electromagnetically operated contactors CR1 through CR6 associated, respectively, with the individual conveyers, contactor CR1 being associated with the first conveyer, etc. These contactors, as well as the associated contactors CR7, CR8, and CR9, are of conventional construction, the contacts whereof occupy the positions illustrated in the drawings when the associated coils are deenergized, and being moved to and retained in an opposite position when and as long as such coils are energized.

The system employs a plurality of starting buttons 601, 602, 603, 604, 605, and 606 which are associated respectively with contactors CR1 through CR6 and a corresponding series of stop buttons 611, 612, 613, 614, 615, and 616. In addition, a start button 620 is provided which is operatively associated with all of the contactors CR1 through CR6 and which co-operates, as described below, with contactors CR7.

The above-mentioned contactors CR8 and CR9 are associated with the control circuits for starting and stopping the previously mentioned furnace timed motor 621. As previously mentioned, furnace 34 is of a conventional type, the feed and discharge wherefrom of workpieces is controlled by timer motor 621, such feed and discharge taking place so long as motor 621 is in operation and being interrupted when such motor is stopped.

It is believed that the remaining details of Figs. 18A and 18B may best be understood from a description of operation. The system may be conditioned for operation by closing the usual disconnect switches 622 which connect line conductors L1, L2, and L3 to a suitable source of current which may, for example, be three-phase, sixty-cycle, alternating current; and by closing the usual disconnect switches 623 which connect supply conductors L4 and L5 to a suitable source of supply appropriate for the operation of the furnace timer motor 621 and the valves associated with the furnace pusher rams. Only one pair of such valves 624—625 is shown, it being understood that there is one pair for each furnace groove. This additional source of supply may, for example, be a twenty-five cycle alternating current source.

When the mill is shut down for any substantial period, it is preferred, of course, to empty the furnace of all workpieces. In starting up the mill, accordingly, it is preferred to start the furnace feed before the mill conveyers are started, so that the mill conveyers do not run idly until the furnace is ready to start discharging workpieces. In starting up the furnace, accordingly, timer motor 621 is first started by closing an associated start button 630, which completes an obvious energizing circuit for the coil of contactor CR9, which thereupon completes a self-holding circuit for itself through its contacts *a* and completes an obvious energizing circuit for timer motor 621 through its contacts *b*. In response to this action, motor 621 initiates the feeding of bars into the furnace. By way of illustration, motor 621 is illustrated as controlling two limit switches, one having contacts *a* and *b*, and the other having contacts *c* and *d*. Contacts *a* and *d* are connected in series with the solenoid winding associated with the "forward" air valve 624, and contacts *b* and *c* are associated with the solenoid winding of the "reverse" air valve 625. It will be understood that there is one such pair of limit switches for each furnace groove. Motor 621 controls the limit switches by means of cams which operate the bridging members *e* and *f* in the limit switches. It will be understood that, in accordance with the predetermined timing schedule, which is determined by the speed of motor 621, bridging members *e* and *f* are successively caused to bridge the forward contacts *a* and *d*, and the reverse contacts *b* and *c*, thereby successively energizing and deenergizing the air valves 624 and 625 at proper intervals and in proper timed relation to the relation to the operation of the corresponding valves (not shown) associated with the other furnace grooves.

When the furnace is fully charged interstand conveyers are started. This may be done by closing the start buttons 601, etc., individually thereto. Usually, however, it is preferred to effect such initial starting by closing start button 620 for a short interval.

Closure of button 620 completes an obvious energizing circuit for the coil of contactor CR7 which thereupon closes its contacts *a* through *f*. Closure of the latter contacts completes obvious energizing circuits, in parallel with each other, for the coils of contactors CR1 through CR6, all whereof consequently move to the closed position, closing the illustrated normally open or front contacts and opening the illustrated normally closed or back contacts. Closure of contacts *b* of contactors CR6, CR5, CR4, CR3, and CR2 and closure of contacts *a* of contactor CR1 complete or prepare self-holding circuits for the coils of the corresponding contactors, which are independent of the contacts of contactor CR7, and as soon as all the contactors have assumed the energized position, starting button 620 may be released.

It will be noted that the just-mentioned self-holding circuits are subject to the normally closed, associated stop buttons 611 through 616, and that, in addition, the self-holding circuit for contactor CR5 is subject to the now closed contacts a of contactor CR6; that the self-holding circuit for contactor CR4 is subject to the now closed contacts a of contactor CR5; that the self-holding circuit for contactor CR3 is subject to the now closed contacts a of contactor CR4; that the self-holding circuit for contactor CR2 is subject to the now closed contacts a of contactor CR3; and that the self-holding circuit for contactor CR1 is subject to the now closed contacts a of contactor CR2.

With this operation, it will be appreciated that except for the energizing circuits provided by contactor CR7, each conveyer contactor is subject to control by the contactor associated with the next succeeding conveyer.

Upon being energized, contactors CR1 through CR6 also complete obvious energizing circuits for the associated conveyer motors 114A through 114F which thereupon start the associated conveyers. In addition, the contacts b of contactor CR1 and contacts c of each of contactors CR2 through CR6 interrupt the normally complete circuits for the associated air valves 498 through 503. From previous description it will be appreciated that as long as these air valves are deenergized, the corresponding feed and ejector fingers 392 are maintained in operative position, in which they are enabled to advance the workpieces into the corresponding rolls. When energized, on the other hand, these air valves cause the associated fingers to be withdrawn to ineffective positions. As long as the interstand conveyers 42 are stopped (assuming the disconnect switches 622 are closed), the fingers 392 occupy ineffective positions, but are automatically moved to effective position as above stated, when the corresponding conveyers are started.

In accordance with the present invention, the starting-up of the conveyer system, more particularly the starting-up of the conveyer associated with the first roll stand, automatically takes control of the furnace timer motor 621 and maintains such motor in operation as long as such conveyer is running. More particularly, the energizing winding for contactor CR8 is connected directly across two of the leads associated with conveyer motor 114A. As soon as this motor starts, accordingly, contactor CR8 is energized, which action opens its back contacts a and closes its front contacts b. The opening of contacts a deenergizes contactor CR9 (interrupting the original timer motor circuit), but closure of contacts b completes an obvious alternative energizing circuit for timer motor 621.

It will be appreciated from the foregoing that the momentary closure of starting button 620 has placed the entire conveyer system in operation, has established an effective condition for the individual feed and ejector fingers, and has transferred control of the furnace feed to the conveyer system.

To stop the conveyer system and the furnace feed, stop button 616 associated with contactor CR6 may be momentarily opened, which action interrupts the sole energizing circuit for contactor CR6 and causes the latter to resume its illustrated position. In so doing, contacts a of contactor CR6 interrupt the circuit for contactor CR5, causing it to resume the deenergized position. Similarly, contactors CR5, CR4, CR3, and CR2, respectively, open the energizing circuits for contactors CR4, CR3, CR2, and CR1.

The deenergization of the contactors CR1 through CR6 interrupts the supply circuits for the corresponding conveyer motors 114A through 114F, causing the corresponding conveyers to stop. In addition, the reclosure of contacts b of contactor CR1 and of contacts c of each of contactors CR2 through CR6 recompletes the energizing circuits for the air valves 498 through 503 associated with the feed and ejector fingers, which action causes these fingers to be withdrawn to ineffective position. The stopping of conveyer motor 114A deenergizes contactor CR8, which thereupon resumes the illustrated position, stopping the furnace timer motor 621.

In the event difficulty is encountered in connection with a particular stand or with the associated conveyer, it is, of course, desirable to stop such conveyer, and to also stop all conveyers in advance of it and to stop the furnace feed, it being undesirable under these conditions to stop the conveyers which are beyond the conveyer in question. Such stoppage may be accomplished by opening the stop button associated with the conveyer and stand in question.

For example, assuming difficulty is encountered with the fifth stand or its associated conveyer, stop button 615 may be opened. It will be recognized from previous description that while this action does not interfere with the continued operation of conveyer motor 114F associated with the succeeding conveyer, such action does stop all the conveyer motors 114E through 114A, renders the corresponding feed and ejector fingers ineffective, and also stops the timer motor 621, the action of which has been described previously. Similarly, if the stop button 613 associated with the third stand is opened, motors 114C, 114B, and 114A, and the timer motor 621 are stopped, and the corresponding fingers are rendered ineffective.

After a partial stoppage of the conveyer system, the stopped conveyers and the furnace timer motor may be restarted, and the corresponding fingers may be rendered effective, by closing the start buttons 601 etc. which are individual to such stopped conveyers. It will be appreciated that closure of button 601 is ineffective, unless and until all succeeding contactors have been pulled in, etc. Thus, the conveyers start in the proper sequence, beginning with the foremost one, when motor 114A for the first conveyer restarts, contactor CR8 restarts the furnace timer motor 621.

Controls which will instantly stop the feed of all workpieces back of a point of trouble is of great value, inasmuch as it is impossible to instantly stop the entire rolling mill due to its great size and the inertia forces involved. The foregoing arrangement prevents the piling up and jamming of hot workpieces at the point of trouble, and if the trouble is quickly overcome, before too much cooling of the workpieces occurs, such as by the removal of a cobble, the feed may be resumed in timed relation to all the rolls, and without removing and reheating the stopped workpieces.

What is claimed is:

1. In a roll stand, a frame having a pair of spaced guides, independent bearing blocks slidable, one in each of said guides, a roll shaft journaled in said blocks, an adjustable hold-down acting between said frame and one of said blocks for positioning said roll shaft, a rigid link having one end pivoted on said frame, a second rigid link having one end pivoted to both of said blocks, the respective other ends of both of said links being pivoted to each other, and all of said link pivots being parallel to each other whereby the axis of said shaft is maintained parallel to the axis of said first-mentioned link pivotal connection upon adjustment of said hold-down.

2. In a roll stand, a frame having a pair of spaced guides, independent bearing blocks slidable, one in each of said guides, a roll shaft journaled in said blocks, an adjustable hold-down acting between said frame and one of said blocks for positioning said roll shaft, a rigid link having one end pivoted on said frame, a second rigid link having one end pivoted to both of said blocks, the respective other ends of both of said links being pivoted to each other, and all of said link pivots being parallel to each other whereby the axis of said shaft is maintained parallel to the axis of said first-mentioned link pivotal connection, upon adjustment of said hold-down, said links being disposed transversely with respect to each other so as to permit free limited movement of said blocks in said frame.

3. In a roll stand, a pair of frames secured together in spaced relation, bearing blocks slidable, one in each of said frames, a countershaft journaled in said blocks, a bevel gear on an end of said shaft, a bridge member spanning the space between said frames and rigidly secured to said blocks, a drive shaft journaled on one of said frames adjacent said gear with its axis normal to the axis of said countershaft, a bevel gear slidably keyed on said drive shaft and journaled in said bridge in axially fixed position relative to and meshing with said first-mentioned gear, a roll shaft journaled in said bearing blocks adjacent and parallel to said countershaft, meshing helical gears on said counter and roll shafts, means for axially adjusting one of said helical gears for varying the angular relationship of said shafts, a substantially horizontal rigid link having one end pivoted to said frames, a second substantially vertical rigid link having one end pivoted to said bridge, the respective other ends of both of said links being pivoted to each other and all of said link pivots being parallel to each other whereby the axis of said roll shaft is maintained parallel to the axis of said first-mentioned link pivotal connection during movement of said bearing blocks in said frames.

4. In a roll stand in combination: a frame providing opposed parallel guideways, said frame having opposed transverse keyways extending across the faces of said guideways, respectively; keys secured in said keyways and projecting beyond the faces of said guideways; a pair of bearing blocks slidably mounted in each of said guideways on opposite sides of said keys, respectively; a pair of cooperating rolls journaled in said blocks; a pair of wedges interposed, respectively, on opposite sides of each of said keys, in position to be engaged by said bearing blocks, respectively, said bearing blocks having beveled bases adapted to engage complementary beveled edges of said wedges, respectively; means for longitudinally adjusting said wedges transversally of said guideways for adjustably spacing said bearing blocks from said keys, said means including bars threadedly engaging said wedges together with fixed supports rotatably mounting said bars on said frame; and screw-down means acting between the respective opposite ends of said frame and said blocks, respectively, for urging said blocks against said wedges and tensioning said frame in opposite directions from said keys, thereby to provide a gap between said rolls which remains substantially fixed in position relatively to said keys upon adjustment of said screw-down means.

5. In a roll stand: a frame having opposed parallel guideways; opposed bearing blocks slidably mounted in said guideways, respectively; a roll shaft extending between and journaled in said blocks; a rigid link member having one end pivoted to said frame and its opposite end pivoted to one end of a rigid yoke member the opposite end of which is pivoted to both said bearing blocks, the axes of all said pivots being parallel to said shaft; and an adjustable hold-down acting between said frame and one of said bearing blocks, whereby adjustment of said hold-down displaces said roll shaft to successively parallel positions.

6. In a roll stand in combination: a pair of frames secured together in spaced relation, and having therein, respectively, opposed parallel guideways; opposed upper and lower pairs of bearing blocks slidably mounted in said guideways, respectively; a countershaft extending between and journaled in each pair of said blocks; a bevel gear on the end of each said countershaft; upper and lower bridge members spanning the space between said frames and rigidly secured to the upper and lower pairs of said bearing blocks, respectively; a drive shaft journaled on one of said frames adjacent to said beveled gears with its axis normal to the axes of said countershafts; a pair of bevel gears slidably keyed to said drive shaft and journaled in said upper and lower bridge members, respectively, in axially fixed position relative to and meshing with said first mentioned upper and lower bevel gears, respectively; a roll shaft extending between and journaled in each of said upper and lower pairs of bearing blocks, respectively, said roll shafts being mounted in parallel relation to the countershafts journaled in said upper and lower pairs of bearing blocks, respectively; meshing helical gears on each pair of upper and lower counter- and roll-shafts respectively; means for axially adjusting one of the meshing helical gears of each pair for varying the angular relationship of said counter- and roll-shafts; a rigid link member having one end pivoted to the upper ends of said frames and its opposite end pivoted to one end of a rigid yoke member, the opposite end of which is pivoted to said upper bridge member, the axes of all said pivots being parallel to the upper counter- and roll-shafts; and adjustable hold-down acting between the upper end of said frames and said upper bridge member, whereby adjustment of said hold-down displaces the upper counter- and roll-shafts to successively parallel positions; an adjustable hold-down acting between said frames and said lower bridge member; means for spacing said upper and lower pairs of bearing blocks apart, including a fixed support extending transversely of said frames and secured thereto, whereby adjustment of said hold-down tensions said frame in opposite directions from said fixed support, thereby to provide a gap between said upper and lower roll-shafts which remains substantially fixed in position relative to said frames.

JOHN E. PRESTON.

REFERENCES CITED

The following references are of record in the file of this patent:

UNITED STATES PATENTS

| Number | Name | Date |
|---|---|---|
| 240,774 | Seaman | Apr. 26, 1881 |
| 553,368 | Thomas | Jan. 21, 1896 |
| 632,002 | Uhr | Aug. 29, 1899 |
| 728,849 | Bray | May 26, 1903 |
| 813,597 | Stiefel | Feb. 27, 1906 |
| 991,070 | Keller | May 2, 1911 |
| 1,469,689 | Prius | Oct. 2, 1923 |
| 1,522,473 | Chartener | Jan. 6, 1925 |
| 1,532,488 | Hein | Apr. 7, 1925 |
| 1,544,572 | George | July 7, 1925 |
| 1,608,079 | Wurster | Nov. 23, 1926 |
| 1,774,383 | Klein | Aug. 26, 1930 |
| 1,856,170 | Roux | May 3, 1932 |
| 1,867,331 | Sheehan et al. | July 12, 1932 |
| 1,927,407 | Kessler | Sept. 19, 1933 |
| 1,943,555 | Rode | Jan. 16, 1934 |
| 2,087,831 | Anderson | July 20, 1937 |
| 2,240,362 | Backhaus | Apr. 29, 1941 |
| 2,363,883 | Luzky | Nov. 28, 1944 |

FOREIGN PATENTS

| Number | Country | Date |
|---|---|---|
| 2,895 | Great Britain | Nov. 7, 1866 |
| 4,596 | Great Britain | June 28, 1906 |
| 80,261 | Germany | Apr. 3, 1895 |